United States Patent
Sahin et al.

(10) Patent No.: US 10,470,198 B2
(45) Date of Patent: Nov. 5, 2019

(54) METHOD AND APPARATUS FOR DUAL-BAND MESH OPERATIONS

(71) Applicant: INTERDIGITAL PATENT HOLDINGS, INC., Wilmington, DE (US)

(72) Inventors: Onur Sahin, London (GB); Arnab Roy, Phoenixville, PA (US); Monisha Ghosh, Chicago, IL (US); Yugeswar Deenoo, King of Prussia, PA (US); Ravikumar V. Pragada, Collegeville, PA (US); Joseph S. Levy, Merrick, NY (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 0 days.

(21) Appl. No.: 15/126,206

(22) PCT Filed: Mar. 13, 2015

(86) PCT No.: PCT/US2015/020465
§ 371 (c)(1),
(2) Date: Sep. 14, 2016

(87) PCT Pub. No.: WO2015/138914
PCT Pub. Date: Sep. 17, 2015

(65) Prior Publication Data
US 2017/0086211 A1    Mar. 23, 2017

Related U.S. Application Data

(60) Provisional application No. 61/953,459, filed on Mar. 14, 2014.

(51) Int. Cl.
*H04W 72/12* (2009.01)
*H04W 74/04* (2009.01)
(Continued)

(52) U.S. Cl.
CPC .......... *H04W 72/12* (2013.01); *H04W 48/16* (2013.01); *H04W 74/04* (2013.01);
(Continued)

(58) Field of Classification Search
None
See application file for complete search history.

(56) References Cited

U.S. PATENT DOCUMENTS 6,928,061 B1 * 8/2005 Garcia-Luna-Aceves ..................
H04W 72/1278
370/329
7,260,079 B1 * 8/2007 Chapman .............. H04W 28/20
370/252
(Continued)

FOREIGN PATENT DOCUMENTS

WO    2008/088190       7/2008
WO    WO-2008088190  *  7/2008  ............... H04B 7/26

OTHER PUBLICATIONS

Alten Calsoft Labs. "802.11s Wireless Mesh Solution." Online Whitepaper. Apr. 9, 2013.*
(Continued)

*Primary Examiner* — Andrew C Oh
(74) *Attorney, Agent, or Firm* — Volpe and Koenig, P.C.

(57) ABSTRACT

Methods and apparatus may perform dual-band or multi-band mesh operations. A dual-band mesh station (MSTA) capable of operating in an O-band and a D-band may seek to join a mesh network, and may receive O-band beacons from at least one MSTA in the mesh network, where the O-band beacons may include D-band mesh information. The joining MSTA may transmit D-band beacons in a time-period specified by the O-band beacon, and on a condition that a beacon response message is received, may further transmit D-band association information via O-band management frames to join mesh network on the D-band. The
(Continued)

joining MSTA may perform contention-free scheduled access in the D-band while sharing D-band transmission information in the O-band to enable concurrent communication in the D-band by neighboring multi-band MSTAs.

16 Claims, 11 Drawing Sheets

(51) Int. Cl.
  *H04W 48/16* (2009.01)
  *H04W 72/04* (2009.01)
  *H04W 84/10* (2009.01)
  *H04W 84/18* (2009.01)
(52) U.S. Cl.
  CPC ........ *H04W 72/0426* (2013.01); *H04W 84/10* (2013.01); *H04W 84/18* (2013.01)

(56) References Cited

U.S. PATENT DOCUMENTS

| | | | | |
|---|---|---|---|---|
| 8,218,522 B2* | 7/2012 | Sy | ............... | H04W 74/04 370/238 |
| 8,787,333 B2* | 7/2014 | Denteneer | ......... | H04W 74/0816 370/338 |
| 8,879,471 B2* | 11/2014 | Kneckt | ............... | H04W 4/02 370/328 |
| 9,693,288 B2* | 6/2017 | Cho | ............... | H04W 40/244 |
| 2003/0012176 A1* | 1/2003 | Kondylis | ............... | H04W 28/16 370/348 |
| 2004/0100929 A1* | 5/2004 | Garcia-Luna-Aceves | ............... | H04W 72/1278 370/338 |
| 2005/0226207 A1* | 10/2005 | Sharma | ............... | H04W 56/001 370/350 |
| 2006/0009246 A1* | 1/2006 | Marinier | ............... | H04W 8/005 455/502 |
| 2006/0057964 A1* | 3/2006 | Roy | ............... | H04B 7/0408 455/67.11 |
| 2007/0104215 A1* | 5/2007 | Wang | ............... | H04L 45/02 370/458 |
| 2007/0183373 A1* | 8/2007 | Gao | ............... | H04L 47/14 370/338 |
| 2007/0293218 A1* | 12/2007 | Meylan | ............... | H04W 74/0816 455/434 |
| 2008/0137620 A1* | 6/2008 | Wang | ............... | H04W 72/0446 370/337 |
| 2010/0014463 A1* | 1/2010 | Nagai | ............... | H04B 7/0695 370/328 |
| 2010/0034138 A1 | 2/2010 | Anjum et al. | | |
| 2010/0091657 A1* | 4/2010 | Tsfaty | ............... | H04W 52/0248 370/241 |
| 2010/0177670 A1* | 7/2010 | Hottinen | ............... | H04L 5/003 370/294 |
| 2011/0164621 A1* | 7/2011 | Lee | ............... | H04B 7/15521 370/400 |
| 2011/0170573 A1 | 7/2011 | Kim et al. | | |
| 2011/0275322 A1* | 11/2011 | Sawai | ............... | H04W 72/085 455/41.2 |
| 2011/0317702 A1* | 12/2011 | Ho | ............... | H04L 12/44 370/392 |
| 2013/0114586 A1* | 5/2013 | Kim | ............... | H04L 5/0091 370/338 |
| 2013/0136016 A1* | 5/2013 | Lee | ............... | H04W 84/12 370/252 |
| 2013/0235852 A1* | 9/2013 | Segev | ............... | H04W 72/044 370/336 |
| 2013/0294354 A1* | 11/2013 | Zhang | ............... | H04W 72/04 370/329 |
| 2014/0169349 A1* | 6/2014 | Vyas | ............... | H04W 84/12 370/338 |
| 2014/0254459 A1* | 9/2014 | Gelal | ............... | H04L 12/18 370/312 |
| 2014/0254569 A1* | 9/2014 | Abraham | ............... | H04L 5/0092 370/336 |
| 2014/0376392 A1* | 12/2014 | Hegde | ............... | H04W 48/16 370/252 |
| 2015/0098392 A1* | 4/2015 | Homchaudhuri | ............... | H04W 48/20 370/329 |
| 2015/0124793 A1* | 5/2015 | Jeong | ............... | H04W 48/16 370/338 |
| 2015/0163828 A1* | 6/2015 | Vandwalle | ............... | H04W 52/383 370/330 |
| 2015/0208330 A1* | 7/2015 | Park | ............... | H04W 48/16 370/338 |
| 2016/0007315 A1* | 1/2016 | Lundgreen | ............... | G01S 3/46 455/67.11 |
| 2016/0029403 A1* | 1/2016 | Roy | ............... | H04W 72/0406 370/336 |
| 2016/0205615 A1* | 7/2016 | Seok | ............... | H04W 48/16 370/338 |
| 2016/0381646 A1* | 12/2016 | Li | ............... | H04W 74/0816 370/338 |

OTHER PUBLICATIONS

Cooney et al., "60 GHz Technology, 11ad Driving Market Growth," ABI Research (Nov. 20, 2012).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmb/D12 (Nov. 2011).
IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Prioritization of Management Frames, IEEE Std 802.11ae™-2012 (Apr. 6, 2012).
IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 10: Mesh Networking, IEEE Std 802.11s-2011 (Sep. 10, 2011).

* cited by examiner

| ORDER | INFORMATION | |
|---|---|---|
| 49 | MESH ID | ~502 |
| 50 | MESH CONFIGURATION | ~504 |
| 51 | MESH AWAKE WINDOW | ~506 |
| 52 | BEACON TRAINING | ~508 |
| 53 | MCCAOP ADVERTISEMENT OVERVIEW | ~510 |
| 54 | MCCAOP ADVERTISEMENT | ~512 |
| 55 | MESH CHANNEL SWITCH PARAMETERS | ~514 |

| ORDER | INFORMATION | |
|---|---|---|
| 1 | CATERGORY | ~602 |
| 2 | MESH ACTION | ~604 |
| 3 | MCCAOP SETUP REQUEST ELEMENT | ~606 |

| | | | | 11s/11ad | 11s/11ad | 11s/11ad |
|---|---|---|---|---|---|---|
| ELEMENT ID | LENGTH | ADVERTISEMENT SET SEQUENCE NUMBER | MCCAOP ADVERTISEMENT ELEMENT INFORMATION | TX-RX PERIODS REPORT | BROADCAST PERIODS REPORT | INTERFERENCE PERIODS REPORT |
| OCTETS: 1 | 1 | 1 | 1 | VARIABLE | VARIABLE | VARIABLE |

FIG. 7

METHOD AND APPARATUS FOR DUAL-BAND MESH OPERATIONS

CROSS REFERENCE TO RELATED APPLICATIONS

This application is the U.S. National Stage, under 35 U.S.C. § 371, of International Application No. PCT/US2015/020465 filed Mar. 13, 2015, which claims the benefit of U.S. Provisional Application No. 61/953,459, filed Mar. 14, 2014, the contents of which are hereby incorporated by reference herein.

BACKGROUND

Wireless devices have been developed that may operate, for example, in the O-band (<6 GigaHertz (GHz)) and/or the D-band (>28 GHz). Devices that operate in both bands may be referred to as dual-band devices, and the use of dual-band devices is increasing. Wireless stations may communicate with each other in peer-to-peer fashion. Such peer-to-peer operation may result in mesh operations. A mesh network device may be referred to as a mesh station.

SUMMARY

Methods and apparatus may perform dual-band mesh operations. Dual-band device discovery and beamforming training may include the use of both D-band and O-band transmission ranges. A mesh station (MSTA) may join an existing mesh and receive information concerning the mesh profile and mesh transmission schedules. The new mesh station may use the transmission schedule information to conduct a Sector Level Sweep (SLS) without interfering with the beacons of the MSTAs currently operating in the mesh and without spatial overlap. One MSTA may perform a sector sweep in a slot different from that used by another MSTA.

Two MSTAs in the mesh network may transmit to each simultaneously. MSTAs may prioritize transmission schedules based on quality of service (QoS), and/or the capabilities of the MSTAs. MSTAs may route data based on transmitting in multiple bands and interference minimization. The MSTAs may use both 802.11ad and 802.11s procedures, conduct mesh peering and use buffer status information.

BRIEF DESCRIPTION OF THE DRAWINGS

A more detailed understanding may be had from the following description, given by way of example in conjunction with the accompanying drawings further comprising:

FIG. 5 is a diagram of an example 802.11s beacon frame body;

FIG. 6 is a diagram of an example Mesh Coordinated Channel Access (MCCA) Setup Request Frame;

FIG. 7 is a diagram of an example of an MCCA Advertisement Element;

DETAILED DESCRIPTION

Figure 1A:
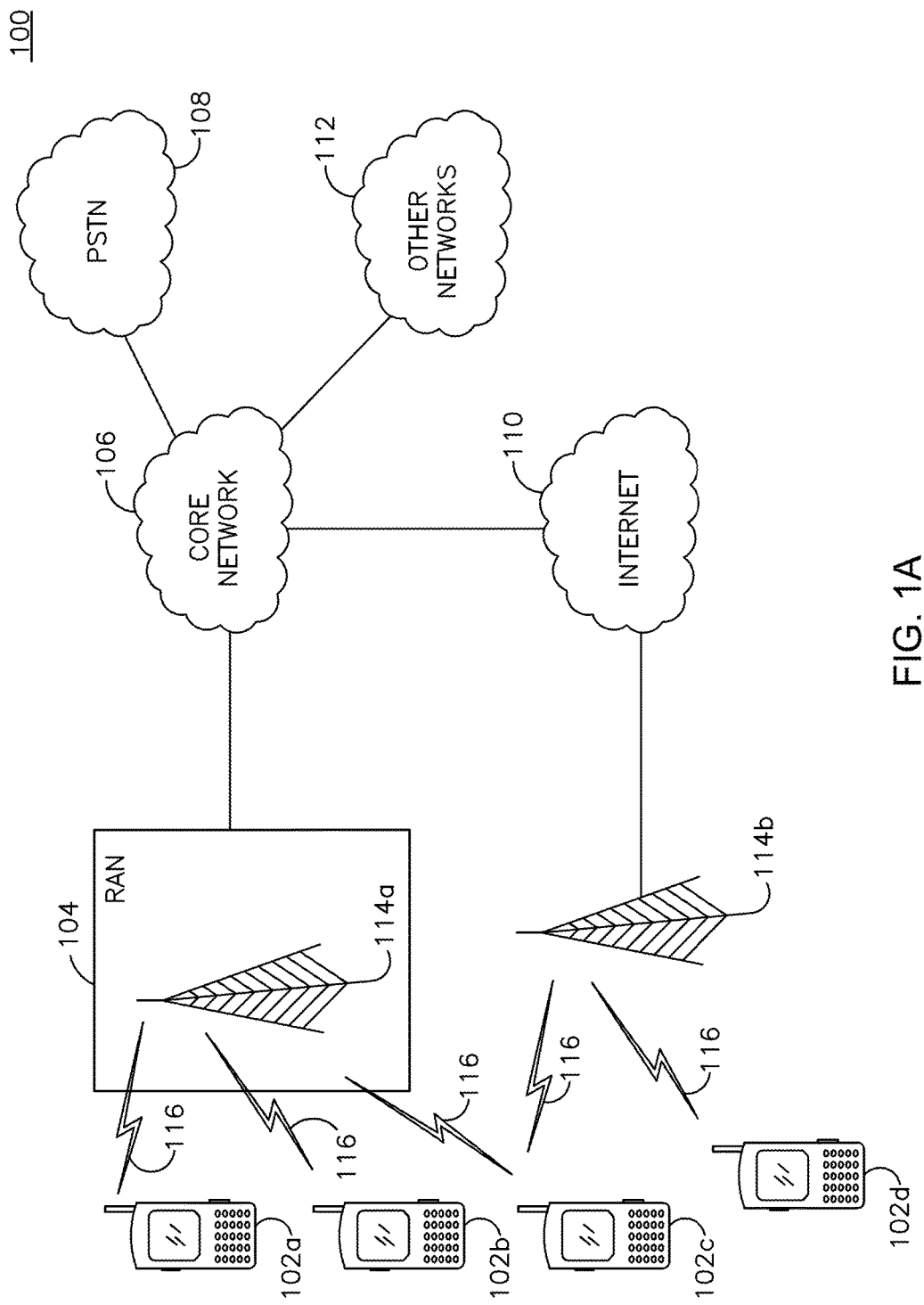
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a STA-B, an eSTA B, a Home STA B, a Home eSTA B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay STAs, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute for Electrical and Electronics Engineers (IEEE) 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home STA B, Home eSTA B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
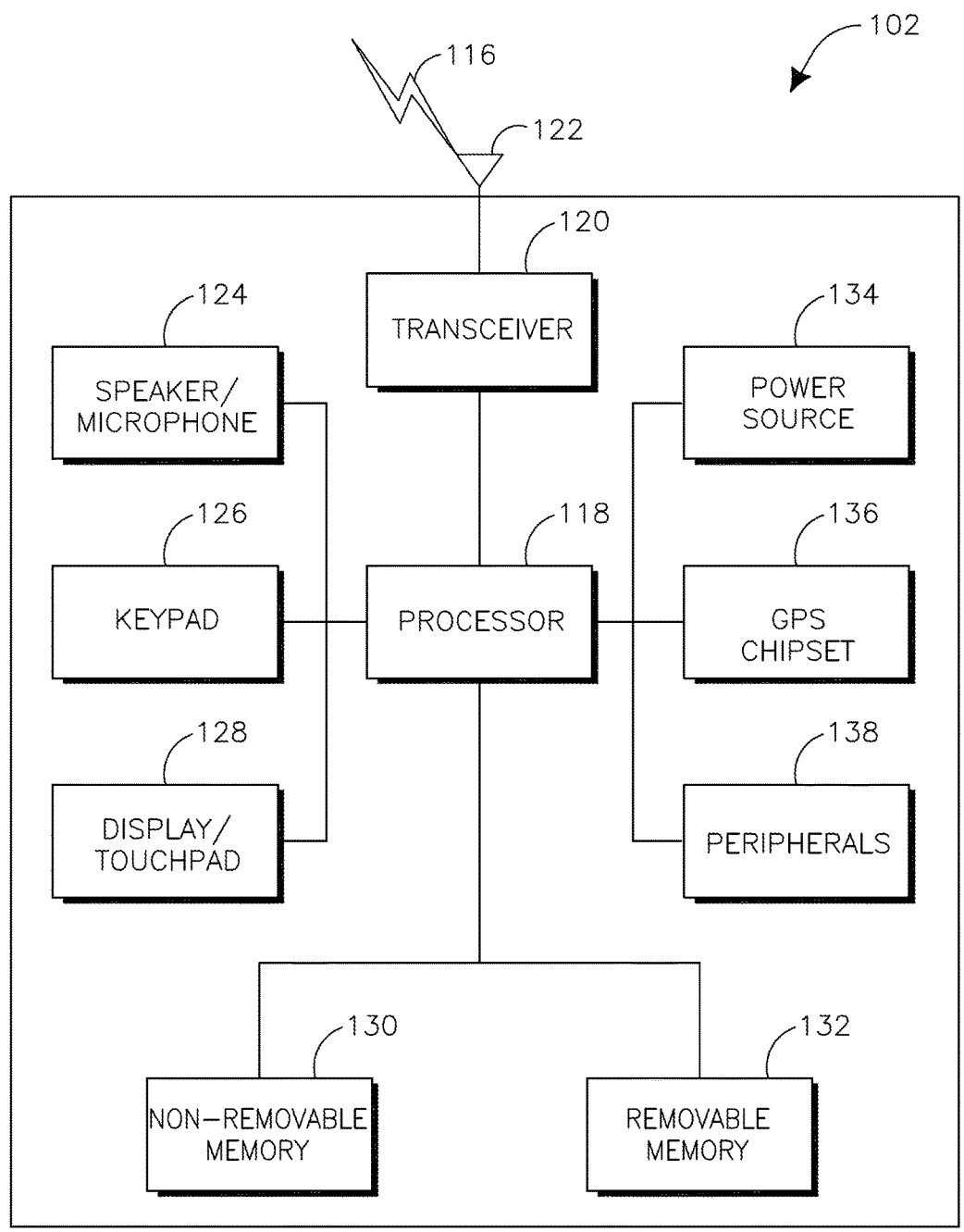
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
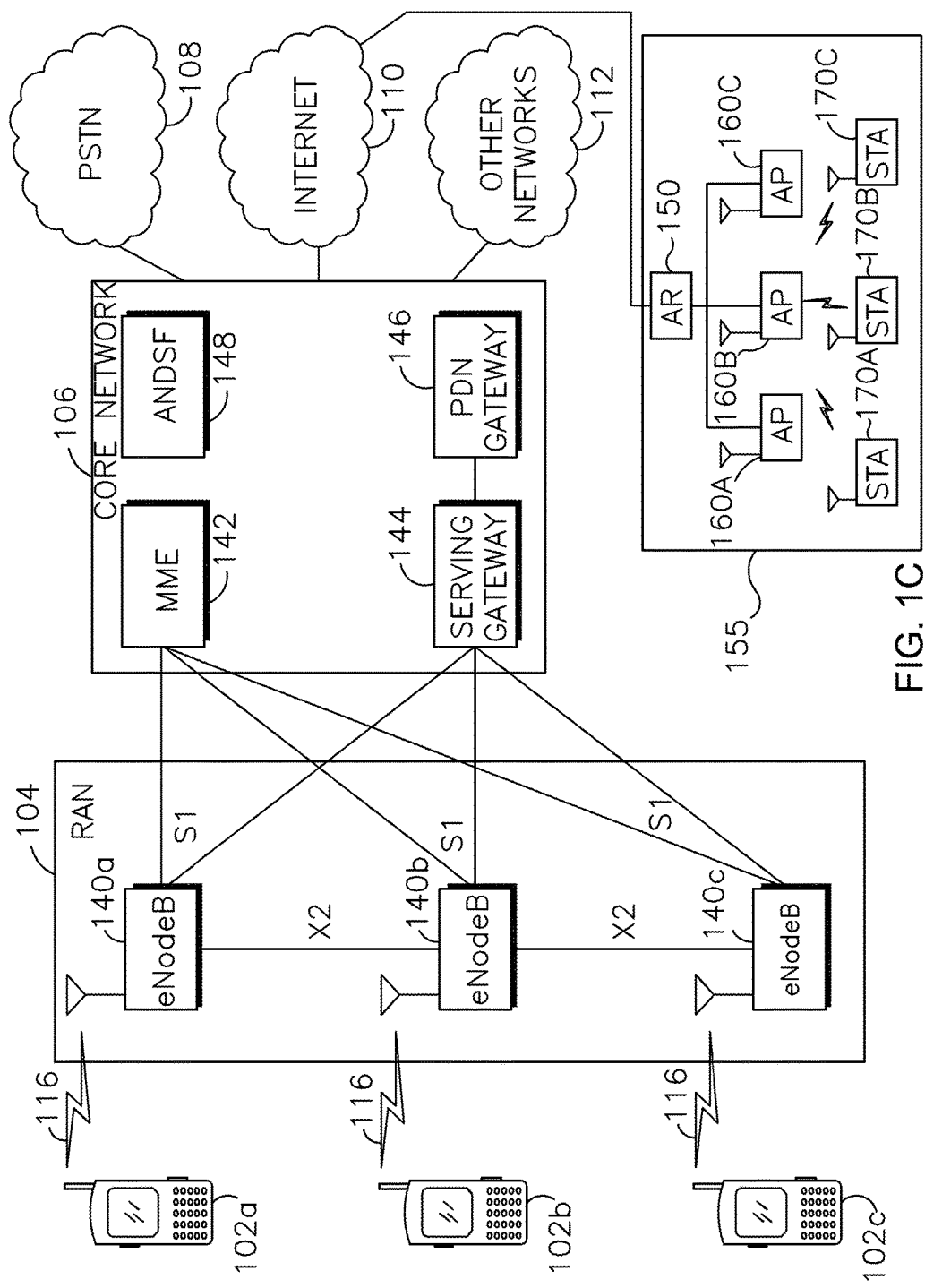
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eSTA-Bs 140a, 140b, 140c, though it will be appreciated that the RAN 104 may include any number of eSTA-Bs while remaining consistent with an embodiment. The eSTA-Bs 140a, 140b, 140c may each include one or more transceivers for communicating with the WTRUs 102a, 102b, 102c over the air interface 116. In one embodiment, the eSTA-Bs 140a, 140b, 140c may implement MIMO technology. Thus, the eSTA-B 140a, for example, may use multiple antennas to transmit wireless signals to, and receive wireless signals from, the WTRU 102a.

Each of the eSTA-Bs 140a, 140b, 140c may be associated with a particular cell (not shown) and may be configured to handle radio resource management decisions, handover decisions, scheduling of users in the uplink and/or downlink, and the like. As shown in FIG. 1C, the eSTA-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eSTA-Bs 140a, 140b, 140c in the RAN 104 via an Si interface and may serve as a control STA. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eSTA Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eSTA B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with stations (STAs) 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WLAN in an Infrastructure Basic Service Set (BSS) mode may have an AP for the BSS and one or more MSTAs associated with the AP. The AP typically may have access, or interface, to a Distribution System (DS), which may connect the BSS to other wired/wireless network(s) that may carry traffic outside of the DS. Traffic to MSTAs that originates from outside the BSS may arrive through the AP and may be delivered to the STAs. Traffic originating from MSTAs to destinations outside the BSS may be sent to the AP to be delivered to the respective destinations. Traffic between MSTAs within the BSS may also be sent through the AP where the source STA may send traffic to the AP and the AP may deliver the traffic to the destination STA. Such traffic between MSTAs within a BSS may be considered peer-to-peer traffic. Such peer-to-peer traffic may also be sent directly between the source and destination MSTAs with a direct link setup (DLS). Example protocols for DLS include, but are not limited to, 802.11e DLS or 802.11z tunneled DLS (TDLS). A WLAN using an Independent BSS (IBSS) mode may have no AP and MSTAs may communicate directly with each other. This mode of communication may be referred to as an "ad-hoc" mode of communication.

IEEE 802.11 standards include specifications for implementing WLAN with different architectures and operating in a variety of frequency bands. For example, IEEE 802.11s is a standard for mesh networking with the intention of defining how wireless devices can interconnect to create a WLAN mesh network that may be used for static topologies and ad-hoc networks. An 802.11s mesh network device may be labeled as a Mesh Station (MSTA). MSTAs may form mesh links with one another, over which mesh paths may be established using a routing protocol. 802.11s extends the IEEE 802.11 MAC standard by defining an architecture and protocol that support both broadcast/multicast and unicast delivery using radio-aware metrics over self-configuring multi-hop topologies.

According to 802.11ad, for example, Very High Throughput transmissions may use the 60 GHz band. Wide bandwidth spectrum at 60 GHz is available, thus enabling very high throughput operation. 802.11ad may support up to 2 GHz operating bandwidths and the data rate may reach up to 6 Giga-bits-per-second (Gbps). The propagation loss at 60 GHz may be more significant than at the 2.4 GHz or 5 GHz bands, thus beamforming has been adopted in 802.11ad as a means to extend the coverage range.

Another example feature of the 802.11ad is scheduled channel access mode in addition to contention-based access. This may allow an AP and a STA to gain predictable access to the channel. Further, in addition to the IBSS, 802.11ad may use a Personal Basic Service Set (PBSS) as an ad-hoc network. Similar to the IBSS, the PBSS may be a type of IEEE 802.11 LAN in which MSTAs may communicate directly with each other. In contrast to the IBSS, in a PBSS a STA may assume the role of the PBSS control point (PCP).

Tri-band enabled chipsets may enable combinations of 802.11 transmissions including, but not limited to, 802.11n/802.11ac/802.11ad transmissions. Devices incorporating these multi-band chipsets may form multi-band mesh networks and derive the resulting benefits. Examples of possible benefits of multi-band mesh networks, which may include at least one O-band channel (<6 GHz) and one D-band channel (>28 GHz), include, but are not limited to, any of the following. For example, dual- (or multi-) band mesh networks may have omnidirectional transmission capability in O-band, which may provide improved coverage and reliability, and may leverage the large available bandwidths and spatial multiplexing available at higher frequencies. In another example, due to directional transmission in D-band, mutual interference between neighboring MSTAs may be significantly reduced, and may allow multiple simultaneous directional transmissions between neighboring STA pairs. As a result, data transmissions in a directional mesh network may not be affected by the channel access limitations seen in O-band meshes, thereby improving the overall network capacity. According to another example, due to greater range in O-band, low data rate data including for example control packets, may be sent in the O-bands, although certain time critical data may not. Additionally, in case of occasional link failures in D-band due to obstructions or other reasons, O-band channels may be used for regular data transmission.

Approaches to improve operations in dual-band mesh networks are described herein. For example, during 802.11ad beamforming stage Sector Level Sweep (SLS), directional beacons may be transmitted in multiple directions by a STA, which may potentially interfere with ongoing 802.11ad based transmission(s) in the system. This may require coordination among neighbor MSTAs including 1-hop, 2-hop (or more hop) neighbors, and/or an MSTA that wants to join the network. 802.11s beacon collision avoidance mechanisms may rely on, for example, completely silencing the beacon transmission of the MSTA during the known beacon transmission time of the neighbors. This approach may be too restrictive, may add excessive delay, and may not effectively use the spatial separation in the scenario of multiple directional beacon transmission of SLS phase of 802.11ad. To address these issues, according to an embodiment described herein, a beacon beamforming scheduling mechanism may be based on the transmission scheduling of neighbor MSTAs.

In another example, 802.11s beacon frame information elements (IEs) as well as management frames such as Mesh Coordinated Channel Access Opportunity (MCCAOP) set-up request, MCCAOP set-up reply, and Mesh Coordinated Channel Access (MCCA) advertisements, may not be capable of 802.11ad related information such as SLS scheduling, 802.11ad Transmission Opportunity (TXOP) request, and/or 802.11ad based transmit-receive (TX-RX) reports and/or interference reports. Hence, such IEs or frames may not be able to be used to schedule 802.11ad frames for beamforming training and/or data scheduling. Thus, according to an embodiment described herein, 802.11s beacon IEs and/or management frames may include directional scheduling information.

According to another example, the transmission range in sectorized 60 GHz transmission may be longer than sub 5 GHz at the same STA due to interference and/or heavy traffic load in 5 GHz. In this case, a STA that is not in the range of 802.11s but in the range of 802.11ad may not be able to employ mesh peering (i.e. mesh peer communications) with the requestor STA. Moreover, O-band management frames initiated by the requestor STA may not be used for 802.11ad beamforming or beacon transmission scheduling. In such cases, according to an embodiment described herein, the management frames transmitted by 802.11s may be conveyed via 802.11ad frames instead or in addition to the 802.11s frames. An example procedure may be applied where the MSTAs may carry on mesh peering via 802.1 lad frames, as described herein.

According to another example, a 802.11s data scheduling mechanism, such as MCCA, may allow only a particular MSTA pair to transmit among the 2-hop neighbors in order to minimize the effect of interference within the mesh network. However, for data transmission using directional 802.11ad frames, allowing only one particular pair within the cluster to communicate at a time may result in spectral inefficiency. According to an embodiment described herein, an 802.11s procedure may incorporate the spatial transmission information in the scheduling.

According to another example, an 802.11s data scheduling mechanism, such as MCCA, may not make use of packet Quality of Service (QoS) requirements and/or ordering of user access depending on the traffic requirements. The requestor STA may transmit an MCCA set-up frame based on the TX-RX report of the destination STA. The buffer status report (BSR) may not be exchanged between the requestor and destination STA. For a highly loaded system, this approach may not guarantee QoS-based traffic flow. According to an embodiment described herein, a mechanism may guarantee QoS requirements of the traffic flows, such that actions may be incorporated into 802.11s system procedures.

According to another example, 802.11s routing procedure may be based on single channel metric determination and selection of the paths based on the aggregated metrics at the STAs. On the other hand, for multi-channel operation such as in 802.11s and 802.11ad capable STAs, each STA may have multiple channels (e.g., O-band and/or D-band) to select and forward a packet. 802.11s airtime link metrics may not map to multiple channels. Also, selection of an O-band channel may inherently hinder other (possibly interfering) neighbor MSTAs to transmit. According to an embodiment described herein, a modification may be included in the airtime link metric of 802.11s to address these issues.

According to another example, 802.11s management frames may be transmitted in a contention-based fashion. In highly loaded and potentially interfering networks, the reception of these packets may not be guaranteed and that may impact the scheduling of 802.11ad data packets. To guarantee transmission of 802.11ad scheduling packets using 802.11s management frames, contention-free mechanism or prioritization of management frames may be adopted, in accordance with an embodiment described herein.

Although examples of dual-band mesh operations are described herein with respect to O-band and D-band, the techniques may apply to other bands that may be used in a multi-band mesh network and may use network protocols 802.11s, 802.11ad or any other wireless networking protocol. While two frequency bands are described, it is possible to extend it to other frequency bands for multi-band mesh network operations.

According to procedures described herein, methods may be used for 802.11s based neighbor discovery and mesh peering and may include 802.11ad capabilities of the STAs. In the following examples, it may be assumed that MSTAs have dual-band capability, with for example 802.11s and 802.11ad functionalities in the O-band (omnidirectional transmission capabilities) and the D-band (directional transmission capabilities), respectively.

802.11s management frames may be used to inform the neighbor MSTAs regarding the ongoing neighbor 802.11ad transmissions. The newly joining MSTAs may select their 802.11ad SLS patterns based on this information to avoid interference at the MSTAs.

D-band beacon transmission may be triggered by new STA discovery in O-band. This may reduce the time overhead associated with beacon and sector sweep frame transmission. In IEEE 802.11ad, beacon and sector sweep (SSW) frames may be transmitted during the Beacon Transmission Interval (BTI) and Association-Beam Forming Training (A-BFT) periods, respectively. To quantify the time savings in an example scenario, it may be assumed that there are 64 slots reserved for beacon transmissions and SSW frames in BTI and A-BFT, respectively. Beacon frames may carry extended schedules for four transmissions and there may be four A-BFT slots for contention resolution during A-BFT.

In the example scenario above, the BTI and A-BFT periods together may use approximately 36 milliseconds (ms). In a beacon interval lasting 100 ms, this may constitute approximately 36% overhead, and thus may reduce transmission efficiency proportionately. A method may be used to obviate the need for beacon transmissions and SSW slots in D-band, with associated gains in MAC efficiency.

Figure 2:
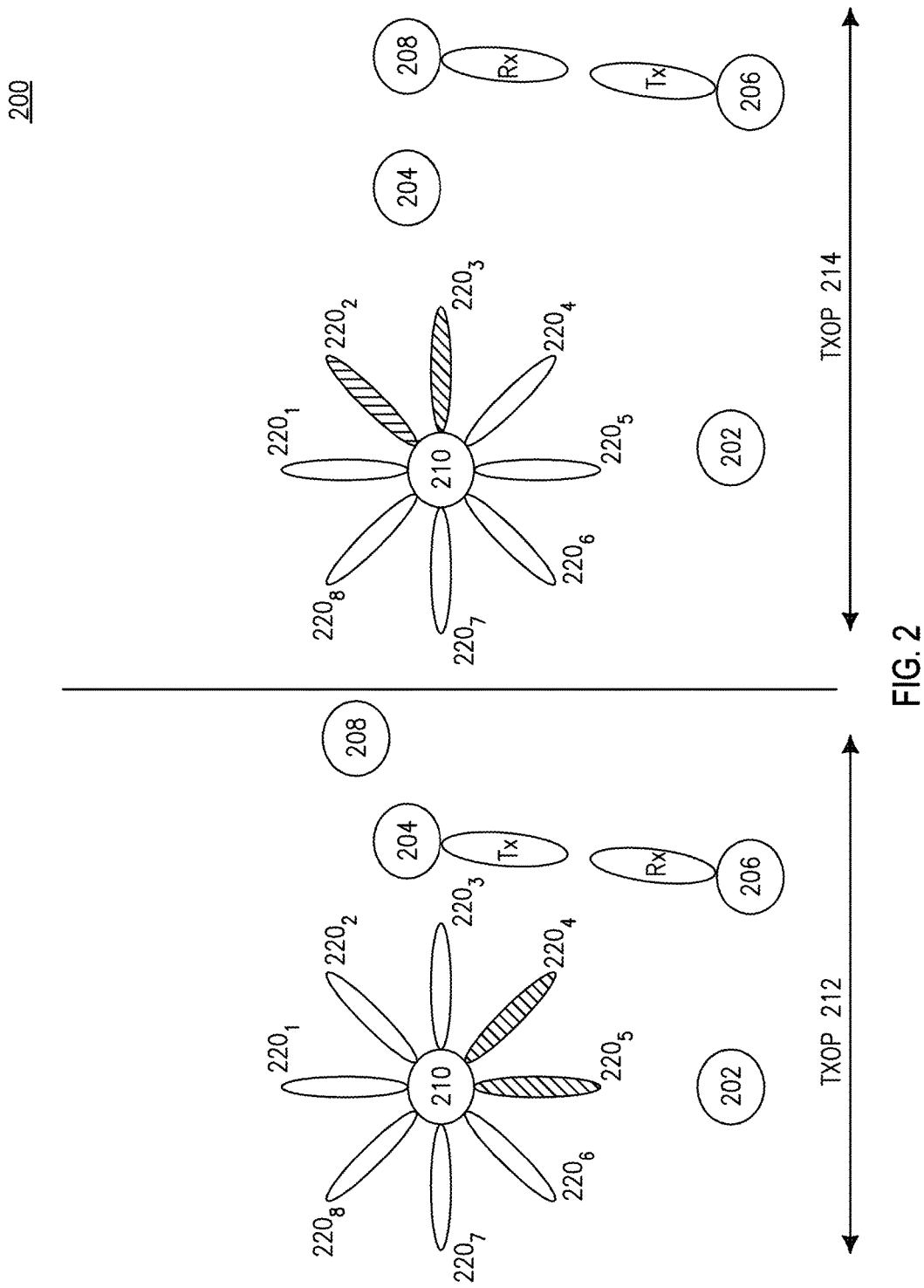
FIG. 2 is a diagram of an example SLS scheduling procedure 200 for a mesh station (MSTA) joining an existing mesh network.

FIG. 2 is a diagram of an example SLS scheduling procedure 200 for an MSTA 210 newly joining an existing mesh network. In the example of FIG. 2, the existing mesh network includes nodes or MSTAs 202, 204, 206, and 208, and two transmission opportunities (TXOPs) are shown, TXOP 212 and TXOP 214. During TXOP 212, MSTA 210 may select the beacon directions from the set of beacons shaded grey including $220_1$, $220_2$, $220_3$, $220_6$, $220_7$, and $220_8$. During TXOP 214, the candidate set of beacons for MSTA 210 (shaded grey) includes beacons $220_1$, $220_4$, $220_5$, $220_6$, $220_7$, and $220_8$. MSTA 210 may avoid sector sweep using beams that would interfere with existing mesh transmissions, such as beams $220_4$ and $220_5$ in TXOP 212, that may interfere with reception at MSTA 206, and beams $220_3$ and $220_4$ in TXOP 214 that may interfere with reception at MSTA 208.

According to an example SLS scheduling procedure, with reference to FIG. 2, MSTA 210 may become part of the mesh network in the 802.11s layer (O-band). Then, MSTA 210 may establish 802.11ad (D-band) links with the neighbors discovered using 802.11s. Hence, MSTA 210 may initially carry out peering procedures in O-band, as described further below.

The peering procedure in O-band may include authentication procedures at D-band as well, and may be needed for information exchange between the MSTAs of the mesh network communicating in D-band. Then, the new MSTA 210 may continue with beamforming/beam refinement procedures in 60 GHz with the neighbor STAs, such as MSTAs 202, 204 and/or 206, in order to establish high rate links in between. The beamforming procedure may require SLS both at the new MSTA 210 and existing MSTAs (e.g., MSTAs 202, 204 and/or 206). 802.11s signaling may be used to minimize the interference due to SLS in 60 GHz, as described below.

MSTA 210 may join the network using a first band, in this example O-band or 802.11s, as follows. MSTA 210, which may be a new STA in the mesh network, may read the 802.11s beacons transmitted by the neighbor STAs, e.g., MSTA 202, MSTA 204, MSTA 206, and/or MSTA 208. If no beacon is received within a predetermined period, MSTA 210 may broadcast probe frames and wait for the probe response.

The MSTAs 202, 204, 206 and 208 of the mesh network may include a mesh profile in the beacon and/or probe response frame. The mesh profile may be provided via a mesh identifier (ID) and/or mesh configuration elements. A mesh profile may include 802.11s profile elements including, but not limited to: Mesh ID, path selection protocol identifier, path selection metric identifier, congestion control mode identifier, and/or 802.11ad (D-band) capability element. The 802.11ad capability elements may include D-band related information such as the antenna capability and/or maximum TX-RX range.

In an example, if the mesh profile of candidate MSTA 202 matches with the profile of the network's profile both in 802.11s and 802.11ad, then MSTA 202 may be considered as a candidate peer MSTA. MSTA 210 may determine an active mesh profile and may be added to the mesh network by carrying out the authentication procedures with MSTA 202. MSTA 210 may perform Target Beacon Transmission Time (TBTT) selection in 802.11s based on the beacon timing information obtained from the neighbors via advertisement frames. Based on the available TXOP, MSTA 210 may schedule particular TXOPs as beacon transmission and inform neighbors, accordingly, via management frames, such as advertisement frames for example.

After being added to the network via an existing MSTA such as MSTA 202, MSTA 210 may proceed with O-band mesh peering with other candidate MSTAs (e.g., MSTAs 204, 206, 208) that are already members of the mesh network. This action may include the authentication procedure in O-band and/or D-band so that the MSTAs 204, 206, 208 may proceed with data transmission/reception procedures in these bands.

According to an embodiment, link establishment may be 802.11ad based. For example, the joining MSTA (e.g., MSTA 210 in FIG. 2) may transmit D-band beamforming request to an MSTA in the mesh network (e.g., MSTA 202 in FIG. 2), or vice versa. The request may be included in the 802.11s beacon or another management frame. In another example, 802.11s data slots may be used to inform the 802.11ad beamforming request. The beamforming request may include the starting time of the procedure, for example, the SLS initiation time by the requestor MSTA (e.g., either MSTA 210 or MSTA 202).

Also, the requestor or initiator MSTA (e.g., either MSTA 210 or MSTA 202 in FIG. 2) may go through an SLS procedure. The SLS may be carried by 802.11ad sector sweep (ScS) frames. Before starting this procedure, however, the initiator MSTA may receive 60 GHz (802.11ad) transmission schedule information of the first tier (i.e. one-hop) neighbors and/or second tier (i.e. two-hop) neighbors. The 802.11ad scheduling information for the initiator MSTA's first tier neighbor MSTAs and/or second tier neighbor MSTAs (neighbors that connect to the initiator MSTA through the first tier neighbors) may be conveyed via 802.11s beacons or management frames by each of the discovered dual-band capable neighbors. The 802.11s management frame structure may include the TX-RX period, broadcast period and interference period in 802.11ad by the neighbor STAs. This information may be incorporated into the MCCAOP Overview element and MCCAOP Advertisement element.

Further, the advertisement elements regarding 802.11ad transmission may include either the direction of transmission or a combination of receiver STA ID and interference table as well which might be utilized by the joining MSTA (e.g., MSTA 210 in FIG. 2) in determining its SLS sweep direction set.

For example, with reference to FIG. 2, the joining MSTA 210 may wait to receive the MCCAOP Overview element and MCCAOP Advertisement element from all neighbors the joining MSTA 210 completed a mesh peering procedure with.

Based on the received advertisement elements including receiver IDs and interference tables, the initiator MSTA (e.g., either MSTA 210 or MSTA 202 in FIG. 2) may determine a SLS schedule that does not spatially overlap with any of the ongoing directional transmissions. This schedule may be communicated to the immediate neighbors via 802.11s messages. This schedule may be further transmitted by the one-hop neighbors to their own one-hop neighbors (i.e. two-hop neighbors of the initiator MSTA), so that they do not schedule new TXOPs with their neighbors during those periods.

According to another embodiment, the MSTAs may have GPS information. For example, with reference to FIG. 2, MSTA 210 may receive the TX-RX report from MSTA 202 and therefore has the information of scheduled transmission in the network. Based on the location information and transmission scheduling of the neighbor STAs, MSTA 210 may select beam-sweeping pattern such that the SLS does not potentially interfere with the ongoing and upcoming neighbor (e.g., first and/or second tier neighbors) 802.11ad transmissions.

In one example, with reference to FIG. 2, since MSTA 202 is already a member of the network, it may have the information of which beam directions/beam numbers (from its perspective) might create interference to the scheduled neighbor 802.11ad transmissions. MSTA 202 may inform MSTA 210 regarding the interference directions along with the corresponding MCCAOPs. After receiving this information, MSTA 210 may determine its directional beacon transmission pattern according to the relative location information with respect to MSTA 202.

According to another embodiment, the MSTAs may not have GPS information, but may have orientation (e.g., via a compass). Further, the STA may use the direction information of the neighbor STAs' transmissions and avoid scheduling the SLS patterns which include those directions.

After determining SLS sweep directions as well as the scheduling, initiator MSTA may inform neighbor MSTAs regarding its SLS schedule in D-band. A selected SLS schedule may be transmitted via 802.11s management frames to one-hop neighbor MSTAs and/or to the two-hop neighbor MSTAs (via 1-hop neighbors). The receiving neighbor MSTAs that have not established directional beam with respect to the initiator MSTA may use these schedules to receive SLS procedures.

The following procedures describe example methods for a dual-band (e.g., 60 G Hz or D-band, and O-band or 2.4 GHz/5 GHz/Sub-1 GHz) mesh capable STA joining a dual-band mesh network that provides for regular beamforming periods in the 60 GHz band. As described above, initial topology for a newly joining STA may be determined by connectivity in the O-band, which may reduce based on 60 G Hz connectivity. According to an embodiment, network discovery may occur in the O-band, while topology for the new STA may be determined by connectivity in the 60 GHz band (e.g., D-band).

Existing MSTAs (i.e., already in the mesh network) may allocate time in the 60 GHz band for beamforming training with new MSTAs that are trying to join the mesh network. Other 60 GHz transmissions may not be scheduled during this periodic allocation, which is common to all mesh STAs. The new (joining) STA may start operation in the O-band, and may discover the 60 GHz band beamforming period information either by passive listening or by O-band message exchange. It may then perform an SLS phase of beamforming training with each neighboring dual-band STA in succession. O-band association may be performed with a particular subset of the dual-band MSTAs that are also reachable in O-band.

Some advantages to this approach may include any of the following. The O-band communication range may be larger than 60 GHz range, for example, in the case that the O-band uses sub-1 GHz band. In this case, the new STA may have fewer neighbors visible in the 60 GHz than in O-band, and may save time by avoiding trying to perform beamforming training with unreachable MSTAs in 60 GHz. This approach applies to the SLS phase of 802.11ad BF training procedure.

Figure 3:
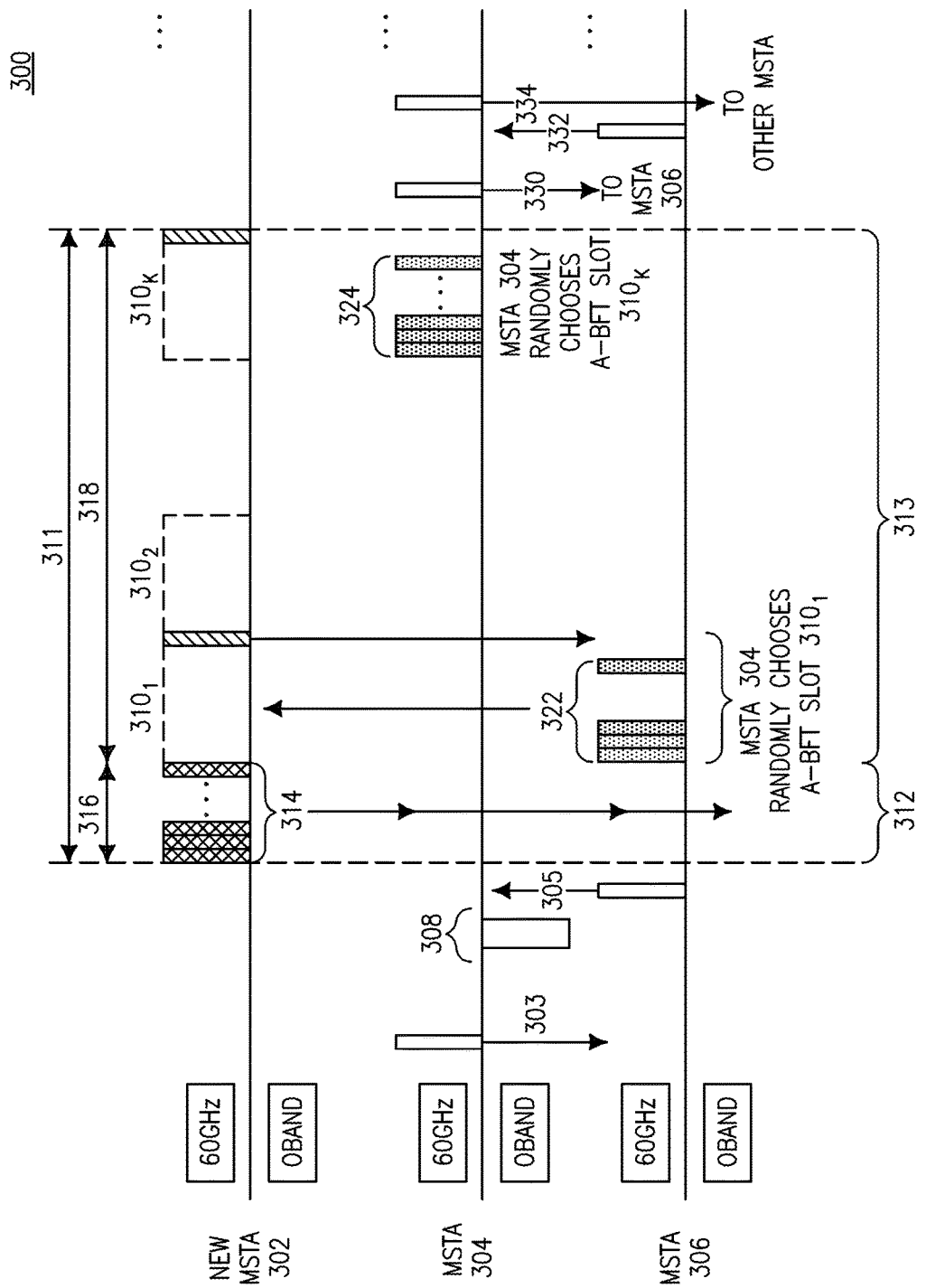
FIG. 3 is a signaling diagram of an example periodic beamforming procedure where periodic beamforming (BF) training periods are scheduled with multiple Association-Beam Forming Training (A-BFT) slots.

The following procedure describes one example of how a new STA (MSTA) may perform initial beamforming training when beamforming (BF) training periods are scheduled periodically. FIG. 3 is a signaling diagram of an example periodic beamforming procedure 300 where periodic BF training periods are scheduled with multiple A-BFT slots. In the example of FIG. 3, new MSTA 302 is trying to join an existing mesh network including MSTA 304 and MSTA 306 (the mesh network may include other MSTAs not shown).

The new MSTA 302 may start operation in O-band and may scan for beacon transmissions from neighboring dual-band mesh STAs, for example the O-band beacon transmission 308 from MSTA 304. The new MSTA 302 may transmit a Probe Request (not shown) if it does not hear a beacon transmission after a predetermined time duration.

The O-band beacon 308 (or Probe Response frame in response to a Probe Request) may contain parameters used in 60 GHz band operation including, but not limited to, channel number and/or supported data rates. The O-band beacon 308 may also include, but is not limited to, beamforming (BF) training period information. For example, the beacon 308 (or Probe Response frame) may contain the start time and duration of the next 60 GHz BF training period 311. The parameters used for 60 GHz operation may be included in the O-band beacons 308 (or Probe Response messages), such that the new MSTA 302 may not associate with an MSTA in the mesh network to obtain these parameters.

The O-band beacon 308 may also include, but is not limited to, other D-band related information such as: D-band capable, D-band channel number, D-band mesh ID, D-band capability, D-band beacon interval, D-band beacon interval control, D-band mesh configuration and/or D-band BF training period information. MSTAs 304 and 306 may be mesh peering and may exchange 60 GHz (D-band) transmissions 303 and 305, including data transmissions, directly with each other.

At the indicated start time of the periodic 60 GHz beamforming (BF) training period 311, the new MSTA 302 may start transmitting beacon or sector sweep (SSW) frames 314 in a slotted manner in multiple directions. This may comprise the Beacon Transmission Interval (BTI) 316. During this time referred to as the initiator sector sweep 312, MSTAs 304 and 306 may receive signals with the widest antenna pattern realizable (e.g., quasi-omni pattern). When an MSTA hears a beacon transmission it may perform a responder sector sweep 313 by transmitting SSW frames. For example, MSTA 306 may perform sector sweep transmissions 322 in a slotted manner to new MSTA 302 during responder sector sweep 313.

Either transmit or receive responder sector sweep 313 may be possible during the Association Beamforming Training (A-BFT) period 318, and the mode may be determined by the appropriate fields in the received beacon or SSW frame 314 during the preceding BTI 316.

When multiple MSTAs receive the beacon or SSW transmissions 314 (also referred to as sectorized frame transmissions 314) by the new MSTA 302, two or more or all of them may respond during A-BFT period 318, which may result in collision. To avoid response collision, A-BFT 318 may have multiple (e.g K) response slots $310_1 \ldots 310_K$, and each slot $310_1 \ldots 310_K$ may have multiple sub-slots, for multiple sector transmissions. MSTAs may choose a particular slot randomly or by some other manner to transmit SSW frames. For example, the MSTA 306 may randomly choose A-BFT slot $310_1$ for the sector sweep transmissions 322. The MSTA 304 may randomly choose A-BFT slot $310_K$ for the sector sweep transmissions 324. The number of A-BFT slots K may be indicated in the beacon or SSW frames 314 transmitted by new MSTA 302 during BTI 316. This may reduce the collision probability because each mesh STA may independently pick a random A-BFT slot $310_1 \ldots 310_K$ to transmit its response. After the training period 311, MSTAs 304 and 306 may exchange 60 GHz (D-band) transmissions 330 and 332, including data transmissions, directly with each other, or exchange 60 GHz (D-band) transmissions 334, including data transmissions with other MSTAs.

Figure 4:
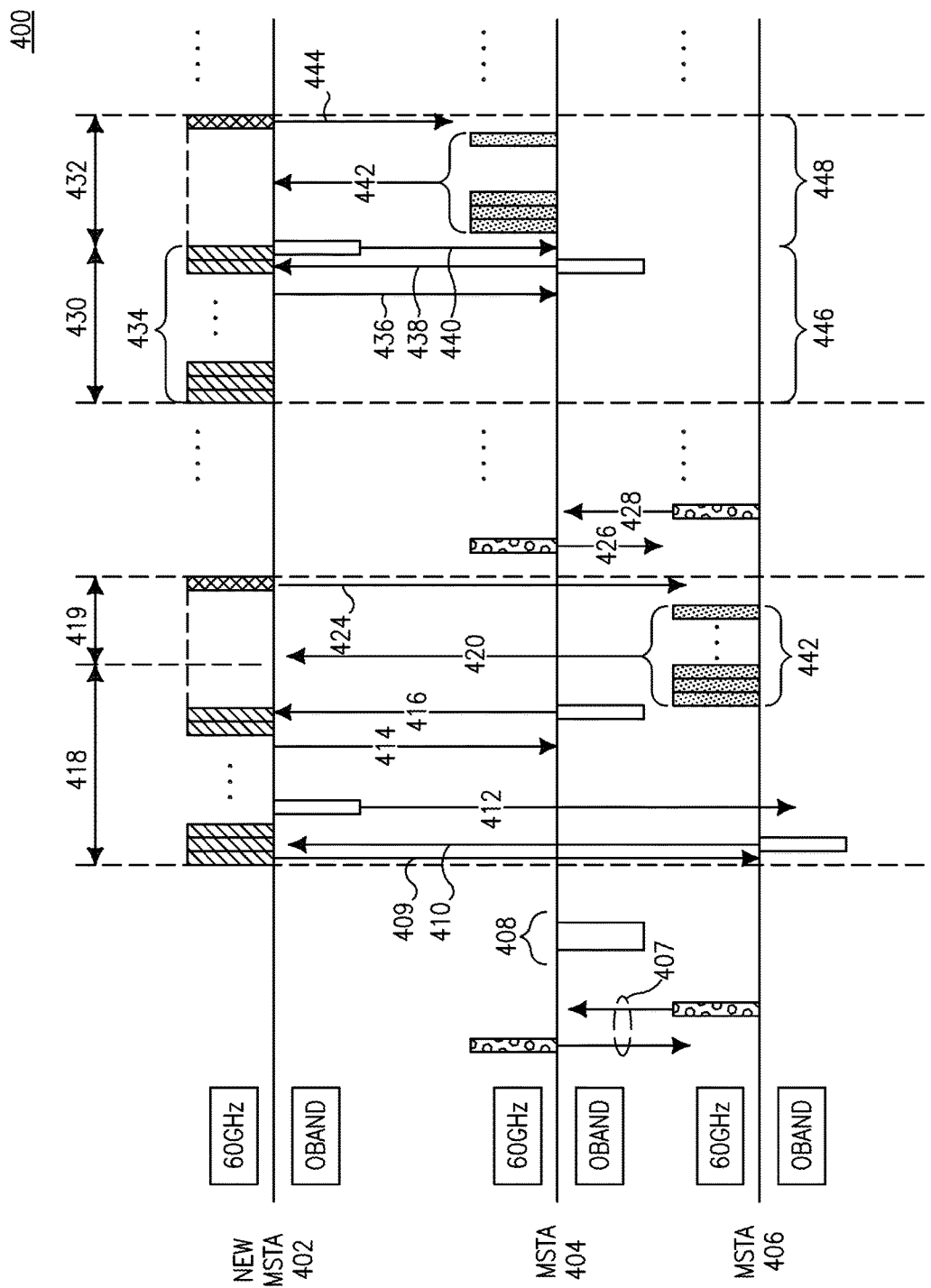
FIG. 4 is a signaling diagram of an example periodic beamforming procedure where periodic BF training periods are scheduled with a single A-BFT slot.

According to another embodiment, SSW frames collisions may also be avoided using O-band signaling. This approach may use a single A-BFT slot, for example. FIG. 4 is a signaling diagram of an example periodic beamforming procedure 400 where periodic BF training periods are scheduled with a single A-BFT slot. In the example of FIG. 4, new MSTA 402 is trying to join an existing mesh network including MSTA 404 and MSTA 406 (the mesh network may include other MSTAs not shown). MSTAs 404 and 406 may be mesh peering and may exchange 60 GHz (D-band) transmissions 407, including data transmissions, directly with each other.

The new MSTA 402 may start operation in O-band and may scan for beacon transmissions from neighboring dual-band mesh STAs, for example the O-band beacon transmission 408 from MSTA 404. The O-Band beacon 408 may include BF training period information, among other information. As in the case described in FIG. 3, the new MSTA 402 may transmit a Probe Request (not shown) if it does not hear a beacon transmission after a predetermined time duration.

During 60 GHz BF training period 418, a MSTA part of the mesh network, such as MSTA 406, may signal a successful 60 GHz beacon 409 or SSW frame reception to the new MSTA 402 via an O-band response message 410, which may include an A-BFT request. The new MSTA 402 may reserve the following A-BFT slot 419 for the use of the responding MSTA's 406 use and may confirm the reservation or A-BFT grant via an O-band response message 412 to the MSTA 406. Other responding MSTAs (e.g., MSTA 404), if any, may also successfully receive a 60 GHz beacon 414 or SSW frame, and signal the same to the new MSTA 402 via an O-band response message 416, which may include an A-BFT request.

The MSTA 404 may not receive the reservation confirmation from the new MSTA 402, due to prior reservation of A-BFT slot by MSTA 406, and may defer transmission during the A-BFT period 432. During the following A-BFT slot 419, MSTA 404 may transmit SSW frames 420 to the new MSTA 402. The new MSTA 402 may send a Sector Sweep Feedback (SSW-Fbck) frame to MSTA 406. In a subsequent 60 GHz BF training period, comprising a BTI and A-BFT periods 430 and 432, the new MSTA may perform beacon or SSW transmissions 434. Assuming beacon 436 is successfully received by MSTA 404, MSTA 404 may respond with an O-band response message 438 and may include an A-BFT request. The new MSTA 402 may reserve the following A-BFT slot 432 for the responding MSTA's 404 use and may confirm the reservation or A-BFT grant via an O-band response message 440 to the MSTA 404.

The new MSTA 402 may complete the SLS procedure with all its neighbors by repeating the above actions in multiple BF training periods. When no more neighbors are found, which may be indicated by no more responses during A-BFT period, the new MSTA 402 may perform association with the MSTA in O-band. It is possible that few of the MSTAs are dropped by the new MSTA 402 at this stage, due to low SNR or other reasons. The new MSTA 402 may additionally perform D-band association or mesh peering.

During the SLS procedure 418 of the new MSTA 402, MSTA 406 may send a SLS response via O-band signaling 410, which may include an A-BFT request. The new MSTA 402 may send O-band response signal 412 to grant A-BFT with MSTA 406. The MSTA 404, at a given interval during the new MSTA 402's SLS 418 and D-band beacon transmission 414 time interval, may transmit an O-band response signal 416, which may include an A-BFT request. Similarly, MSTA 406 may carry out SLS by transmitting D-band beacons 420 during an SLS interval 422. This interval may be selected orthogonal to the new MSTA SLS interval 418 to avoid contention.

The new MSTA 402 may respond to MSTA 406's SLS operation by sending a response beacon 424 to feedback the SLS measurement related outputs. The MSTAs may transmit data via D-band signals 426 and 428 by the beacons scheduled in the previous SLS and A-BFT intervals. In the upcoming time intervals, the D-band SLS transmission (A-BFT) and O-band feedback procedure may be carried out between the new MSTA 402 and MSTA 404, via the BTI interval 430, A-BFT interval 432, beacon or SLS interval 434.

The new MSTA may send D-band beacon 436 where MSTA 404 send the O-band signal 438 to request an A-BFT grant. The new MSTA 402 may send the grant via O-band signal 440. Accordingly, following the initiator SLS period 446, the MSTA 404 may proceed with SLS transmission 442 within the responder sector sweep interval 448. The new MSTA 402 may then send the SLS feedback to MSTA 404 via D band beacon 444.

According to an embodiment, a procedure for O-band-assisted D-band beamforming training is described herein. A D-band beamforming training procedure may be used when D-band MSTAs initiate such a procedure during periodically scheduled BF training periods. Because some of the D-band beacon information is included in the O-band beacon or probe response frames, the D-band frame size may be reduced thereby resulting in a shorter BF training period.

A newly joining MSTA may start operation in the O-band and scan for beacon transmissions from neighboring dual-band MSTAs that are already part of the mesh network. The new MSTA may transmit a probe request if it does not hear a beacon transmission within a certain period.

The beacon or probe response frame may contain parameters used in 60 GHz band operation including, but not limited to, channel number and/or supported data rates, a start time and/or duration of the next 60 GHz BF training period. 60 GHz operation parameters may be included in the O-band beacons or probe response messages, such that the new STA may not associate with an MSTA to obtain these parameters.

The new MSTA may initiate D-band reception after receiving the first beacon frame from a dual-band capable MSTA, where the beacon frame may include, but is not limited to, D-band related information. A first probe response frame may be received instead of a first beacon frame, if no D-band BF training period start time is included in the O-band frames. D-band related information in the O-band beacon may include, but is not limited to: D-band capable, D-band channel number, D-band mesh ID, D-band capability, D-band beacon interval, D-band beacon interval control, D-band mesh configuration and D-band BF training period information.

The MSTA may activate its D-band receiver before the indicated start of the BF training period, if included in the O-band messages. At the start of the periodic BF training period, D-band MSTAs may transmit beacon or SSW frames in a slotted manner in multiple directions. This may occur during the BTI. During this time, the dual-band capable new MSTA may receive with a wide antenna pattern (e.g., a quasi-omni pattern).

When the new MSTA receives a beacon transmission, the new MSTA may perform responder sector sweep by transmitting SSW frames. Either transmit or receive sector sweep is possible in this phase, and the mode may be determined by the appropriate fields in the received beacon or SSW frame during the preceding BTI. This may correspond to the A-BFT period of 802.11ad. When the new MSTA receives sectorized beacons from multiple MSTAs in a single BTI, it may respond to one of them in the A-BFT period. This prioritization to select one of the multiple MSTAs to respond to may be based on, but is not limited to the following examples: received signal strength of the received beacons and/or capability information included in the beacons.

The new MSTA may complete the SLS procedure with all its neighbors by repeating the above actions in multiple BF training periods. When no more neighbors are found, the new STA may perform association or mesh peering with the MSTAs in the O-band. Some MSTAs may be dropped by the new MSTA at this stage, due to low SNR or for other reasons. The new MSTA may additionally perform D-band association or mesh peering.

According to an embodiment, a procedure for a dual-band capable MSTA joining a dual-band mesh via the D-band is described herein. According to this procedure, the new MSTA may perform any of the following: start operations in the D-band; discover its neighbors; perform association and/or mesh-peering with each discovered neighbor in D-band; obtain O-band mesh parameters; and/or perform O-band association or mesh peering with the same MSTAs. The O-band communication range may be larger than the D-band or 60 GHz range, especially if O-band uses sub-1 GHz frequencies, which may benefit this approach.

In this case, the new STA may have fewer neighbors in D-band, and may therefore avoid associating or mesh peering with MSTAs in O-band that are unreachable in D-band. Moreover, O-band mesh related information may be provided to the new MSTA via D-band message exchange, and therefore O-band scanning may be skipped. In another example, the STA may associate with other MSTAs that are reachable in O-band, but not in D-band.

The example procedures are described herein with respect to two frequency bands, however, it is possible to extend it to other frequency bands and more than two frequency bands, resulting in the formation of a multi-band mesh network.

A procedure for dual-band mesh entry via D-band is described in the following. A newly joining MSTA may activate its D-band receiver and listen for beacons, using for example a quasi-omni antenna pattern. Dual-band capable MSTAs may transmit D-band beacons that may include any of the following information about O-band mesh: O-band capable; O-band channel number; beacon interval; capability; supported rates; mesh ID; mesh configuration; mesh awake window; beacon timing; MCCAOP advertisement overview; MCCAOP advertisement; and/or mesh channel switch parameters. The above O-band related information may be included in a subsequent message exchanged between the new MSTA and the existing MSTA in D-band, such as via a probe request message and a probe response message. This may allow the beacon contents to be reduced.

Upon receiving a D-band beacon, the new MSTA may perform BF training and D-band association or mesh peering with the discovered dual-band capable MSTA. Similarly, BF training and association or mesh peering actions may be completed with each discovered D-band MSTA.

After completing D-band mesh peering, the new STA may switch to the O-band and send a mesh peering request frame addressed to an existing STA that was advertised as dual-band capable in the received D-band beacons. The new STA may not perform O-band scanning (active or passive), because it may already have all the information it needs for the peering request from D-band messages.

Alternately, the dual-band capable new MSTA may perform O-band mesh peering with one or more discovered dual-band capable MSTAs immediately after completing D-band mesh peering, without waiting to complete D-band mesh peering with all MSTAs in D-band. Therefore, the new STA may perform O-band mesh peering with a previously discovered dual-band capable mesh STA, while simultaneously proceeding with D-band mesh peering with another STA.

The new MSTA may perform O-band mesh peering with other dual-band capable MSTAs, with which it has previously performed D-band mesh peering. For example, the new MSTA may perform O-band mesh peering with other MSTAs that were not discovered during scanning in D-band. This may occur due to any of the following reasons: the MSTAs may not be dual-band capable; and or the MSTAs are reachable in O-band, but not in D-band. Once mesh peering is completed in all supported bands, the new MSTA may start transmitting beacons in some or all of the bands in which it operates in order for other MSTAs to discover the mesh network. The D-band beacons may also include information for other bands supported by the MSTA.

FIG. 5 is a diagram of an example 802.11s beacon frame body 500. The 802.11s beacon frame body 500 may include, but is not limited to, any of the following elements pertaining to 802.11s information: mesh ID 502, mesh configuration 504, mesh awake window 506, beacon timing 508, MCCAOP advertisement overview 510, MCCAOP advertisement 512, and/or mesh channel switch parameters 514. Any of the elements 502-514 may also include 802.11ad information. The order numbers may be from the IEEE 802.11 2012 specification, for example. For example, beacon timing 508 may include 802.11ad beacon transmit time, the MCCAOP advertisement overview 510 may include 802.11ad advertisement overview, and the MCCAOP advertisement 512 may include an 802.11ad advertisement.

FIG. 6 is a diagram of an example MCCA Setup Request Frame 600. The MCCA Setup Request Frame may include, but is not limited to, any of the following elements for 802.11s information: category 602; mesh action 604; and MCCAOP setup request element 606. The elements 602-606 may include 802.11ad information. For example, MCCAOP setup request element 606 may include 802.11ad scheduling information.

FIG. 7 is a diagram of an example MCCA advertisement element 700. The MCCA advertisement element 700 may include, but is not limited to, any of the following 802.11s information: element ID 702; length 704; advertisement set sequence number 706; MCCAOP advertisement element information 708; TX-RX periods report 710; broadcast periods report 712; and/or interference periods report. In an example, the TX-RX periods report 710, broadcast periods report 712 and/or interference periods report 714 may contain 802.11s and/or 802.11ad information.

Figure 8:
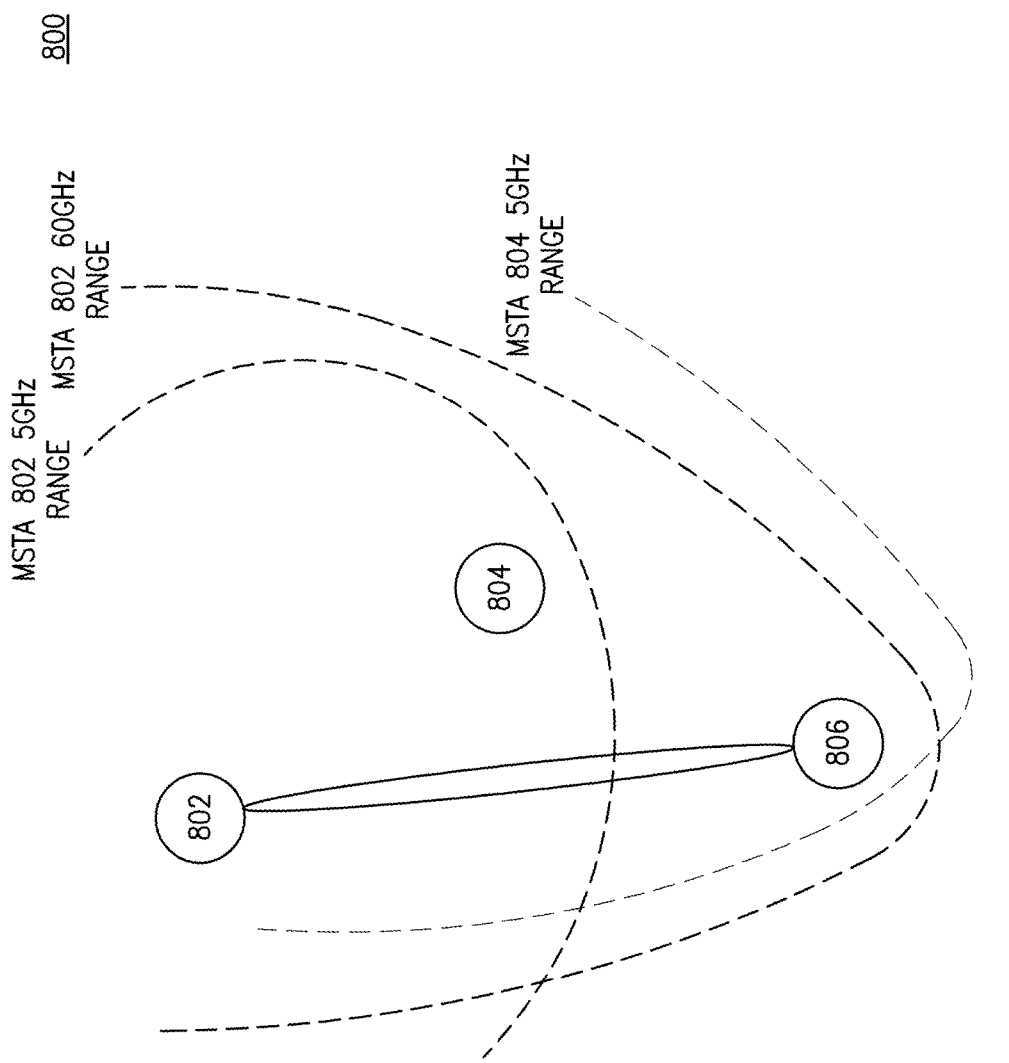
FIG. 8 is a diagram of example dual band mesh network showing example transmission ranges for 60 GHz and 5 GHz.

As discussed above, the transmission range for different frequency bands, such as the 60 GHz band and the 5 GHz band (or sub-1 GHz band), may be different. FIG. 8 is a diagram of example dual band mesh network 800 showing transmission ranges for 60 GHz and 5 GHz. The mesh network 800 includes MSTAs 802, 804 and 806. In the example of FIG. 8, the beamformed 60 GHz transmission range may be longer than the 5 GHz transmission range from the perspective of MSTA 802. The following example procedures describe how an MSTA could discover another MSTA via 802.11ad frames that is not in the range of 802.11s transmission.

Figure 9:
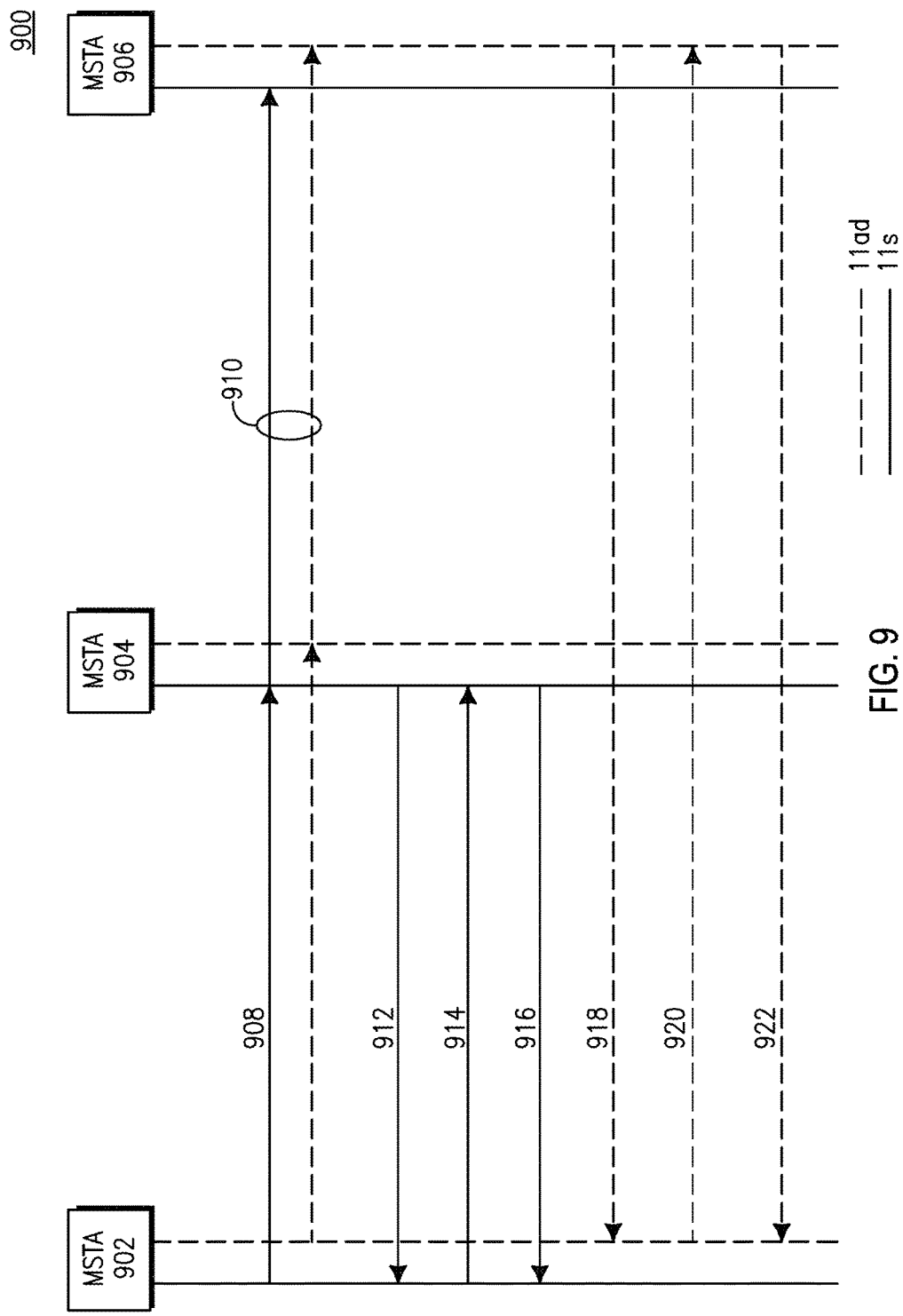
FIG. 9 is a signaling diagram of an example neighbor STA assisted 802.11ad link establishment procedure using GPS information.

FIG. 9 is a signaling diagram of an example neighbor STA assisted 802.11ad link establishment procedure 900 using GPS information. In the example of FIG. 9, MSTA 902 is seeking to join the network including MSTAs 904 and 906, and may proceed with either active or passive 802.11s scanning. As shown in FIG. 9, the black arrows represent 802.11s signaling, and the grey arrows represent 802.11ad signaling.

MSTA 902 may initiate association with the network by listening to 802.11s beacons, 908. In an example, MSTA 902 may receive the 802.11s beacon from MSTA 904 and proceed with mesh peering procedures, as described above. MSTA 904 may inform MSTA 902 by sending a status mention that may include, but is not limited to, any of the following information: 802.11s and/or 802.11ad TX-RX reports, interference reports and (e.g., GPS) location information if it is available. If no 802.11s beacons are detected for a predetermined duration, MSTA 902 may send a probe frame (not shown) to trigger association procedures. According to an example, MSTA 902 and MSTA 904 may have already had association procedures in D-band and/or O-band links in a previous interval (not shown), and hence may be in connected mode.

After the association procedure is completed, MSTA 902 may establish connection with all available neighbor MSTAs from which it is able to detect 802.11s beacons. Then, MSTA 902 may send an advertisement message 914 to its neighbors regarding, for example, its neighbor IDs based on an 802.11s connection and or GPS information. For example, the advertisement message 914 may be an MCCA advertisement overview frame.

In one example, GPS information may be available to the MSTAs 902, 904 and 906. In case MSTA 904 identifies that MSTA 902 and MSTA 906 are not connected via 802.11s, where location information of MSTA 904 and MSTA 902 could be used whether they are capable of establishing connection in 802.11ad, then the following procedure may be followed. MSTA 904 may send a message 916 to MSTA 902 regarding 802.11ad SLS scheduling for MSTA's 904 neighboring STA 906. This may include scheduling information of MSTAs that are not connected to MSTA 902 via 802.11s but are one-hop neighbors of MSTA 904, such as MSTA 906. With the SLS scheduling available, the MSTAs may perform directional TX SLS 918 and RX SLS 920 in order to identify the best TX and RX beams corresponding to MSTA 902. MSTA 906 may send a beam ID feedback message 922. MSTA 906 may send the feedback message 922 to MSTA 902 via D-band signaling to include the beam ID of the received D-band beam with highest SNR in the received SLS 922 carried out by MSTA 902.

In an alternative example, no GPS information may be available to the STAs. With no GPS information available and no 802.11s neighbor STA ID information obtained from the associated STAs, the MSTAs may employ passive listening of 802.11ad beacon transmissions by the joining MSTA. During idle scheduling intervals of the MSTAs (e.g., no transmission or reception is scheduled and no known TBTT from the neighbor STAs), the MSTAs may switch to the listening mode via receive SLS. If an 802.11ad beacon is detected, e.g., above RSSI threshold during the idle periods, the MSTA initiate discovery procedures with the knowledge of beacon transmission time and RSSI.

Once the newly joining MSTA A and a two-hop neighbor MSTA are connected via 802.11ad frames, these MSTAs may pursue mesh peering stage over 802.11ad. In other words, these MSTAs may transmit and receive data over 60 GHz, and hence may be part of the hybrid mesh network.

802.11s MCCA scheduling may be based on omni-directional transmission. In an example, using the spatial separation among the neighbor MSTA transmissions, an 802.11ad scheduling mechanism may be used. The mechanism may include information from the neighbors that may determine the interfering neighbor list. A combination of the interfering neighbor list along with the TX-RX time report may be used to obtain spectrally efficient scheduling among the MSTAs.

Following the mesh MSTA neighbor discovery, mesh peering and 802.11ad beamforming stages, as described above, the MSTAs may establish directional beams with their neighbors. Hence, the MSTAs may have beamformed 802.11ad links with their neighbors along with the 802.11s connection. In order to identify potentially interfering MSTAs, the MSTAs may go through an interference table formation procedure to determine the interference power due to neighbor MSTAs transmission.

Figure 10:
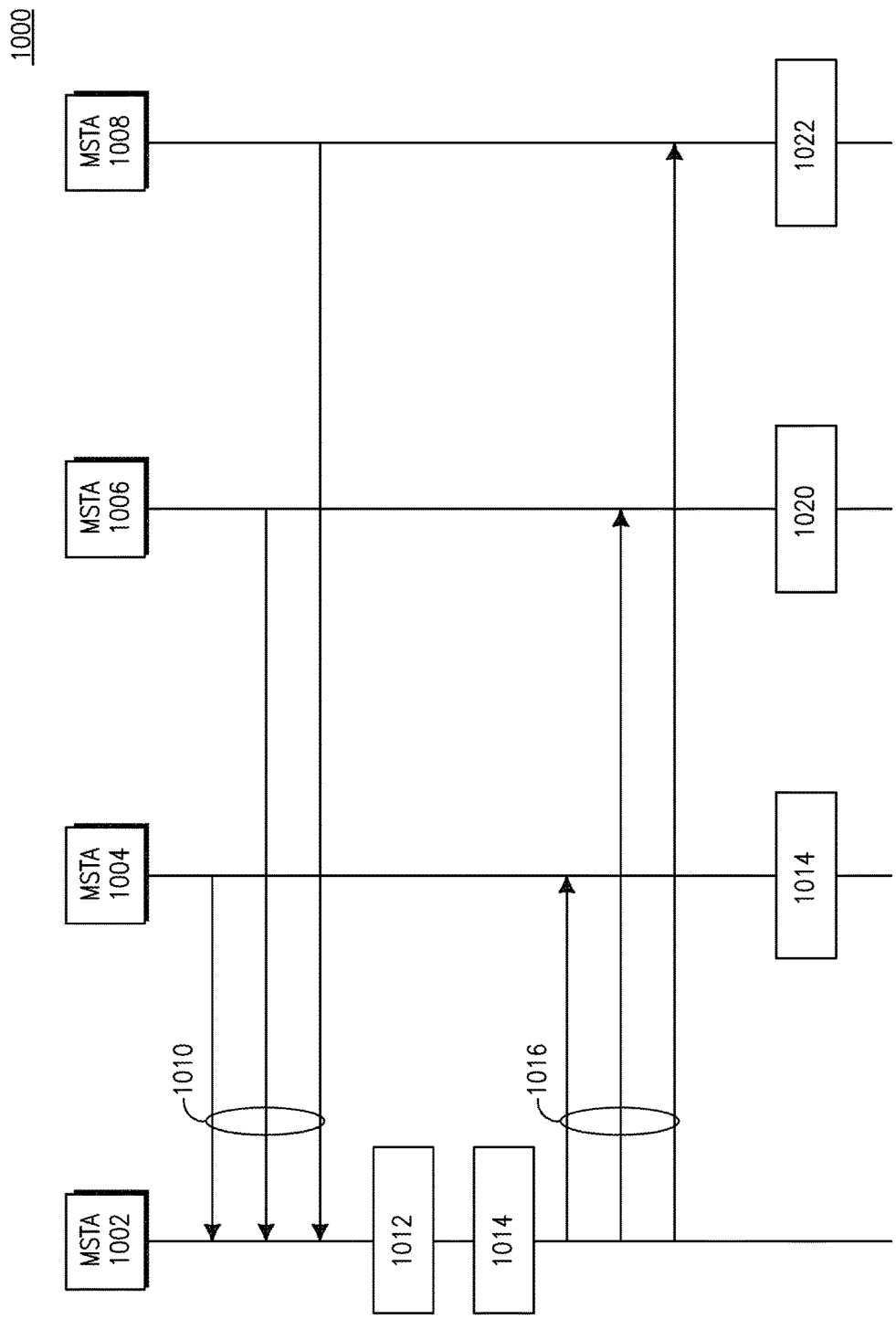
FIG. 10 is a signaling diagram of an example interference measurement procedure from the perspective of a measuring MSTA.

FIG. 10 is a signaling diagram of an example interference measurement procedure 1000 from the perspective of a measuring MSTA 1002. The following describes an example of interference table formation. At action 1012, the measuring MSTA 1002 identifies the scheduled TXOP of MSTAS 1004, 1006, 1008 and opportunistically uses the time slots that are allocated by other MSTAs 1004, 1006, 1008, for their corresponding transmission and reception. These slots may already be known to the measuring MSTA 1002 based on MCCAOP advertisement overview elements 1010 received from the neighboring MSTAs 1004, 1006, 1008. From the MCCAOP advertisement overview element 1010, the measuring MSTA 1002 may identify which MSTA allocates the channel at a given scheduling interval at 1012.

During interference measurement 1014, the MSTA 1002 may switch its receive beams assigned to different neighbors and thus measure the interference at each receive beam. For example, the interference measurement 1014 may be RSSI based or may involve decoding of the received signals. In case the MCCAOP duration allocated by a neighbor MSTA is not sufficient to complete the measurement 1014 for all receive beams, the measuring MSTA 1002 may resume the measurement 1014 in a future MCCAOP allocated for the same neighbor MSTA(s) 1004, 1006, and/or 1008.

In one example, the measurement 1014 may be carried out for two-hop neighbors transmission. In this case, using MCCAOP interference advertisement set, the MSTA 1002 may identify TXOP for the 2-hop neighbors. These slots may be utilized for the measurement campaign by sequentially measuring the interference at the measuring MSTA 1002.

In another example, the measuring MSTA 1002 may send a measurement request message (not shown) to the neighbor MSTAs (e.g., MSTAs 1004, 1006, and/or 1008) that it wishes to make the measurement. The MSTA that receives this request (responder MSTA) may schedule a measurement campaign to sequentially transmit towards its neighbors whereas the measuring MSTA 1002 may perform interference measurement due to these beams. The responder MSTA may determine available TXOPs for sequential transmission. These interference measurement slots may be feedback to the measuring MSTA 1002 via an MCCA advertisement overview.

After the measurement campaign 1014, the MSTAs 1004, 1006, 1008, may determine the received interference due to one-hop and two-hop neighbors and may identify which MSTAs and their corresponding transmission create above the threshold interference.

The measuring MSTA may inform the other MSTAs 1004, 1006, 1008 of the interference level via interference messages 1016, for example EX_INT messages, so that the MSTAs 1004, 1006, 1008, may identify the neighbor MSTAs with which they create over-the-threshold interference. For example, the EX_INT messages 1016 may be carried via management frames using 802.11s links or may be transmitted directly via 802.11ad data links. Then, each MSTA 1004, 1006, 1008, may create an interference table 1018, 1020, 1022, respectively, which determines the MSTAs that they create interference associated with each of its transmit beam.

According to another embodiment, data slots may be scheduled in 802.11ad links. For a data scheduling request, the requestor MSTA may send an MCCA setup request to the responder MSTA, for example using 802.11s frames and/or 802.11ad frames. The requestor MSTA may consider the any of the following inputs to determine the available TXOP to be requested from the responder MSTA: an MCCA advertisement report, a TX-RX report, an interfering times report, and/or an interference table.

The requestor MSTA may utilize spatial transmission by considering the interference table and identifying non-interfering scheduling slots. Then, the requestor MSTA may send an MCCAOP setup request message to the responder MSTA with the scheduling slots to be requested. The responder MSTA may accept or reject the request by checking its own MCCA advertisement report and interference table. The responder MSTA may feedback an MCCAOP reply message where it may accept the reservation request or it may reject it and suggest a new set of scheduling slots.

According to an embodiment, directional MCCA scheduling may be QoS based. Procedures and mechanisms for a 802.11s TXOP scheduling stage are described herein, which may incorporate the QoS requirements of the MSTA traffic packets. MSTAs may be connected via 802.11s and beamformed 802.11ad signals, as described above. The requestor and responder MSTAs may exchange information, including for example TXOP and/or TBTT, via 802.11s based MCCA advertisement frames and/or via 802.11ad based directional MCCA advertisement frames. The requestor MSTA may also include the BSR in the MCCA advertisement in 802.11s packets and/or 802.11ad packets. In one example, 802.11s based advertisement packets may be transmitted in a broadcast fashion so that multiple neighbors may hear the transmission simultaneously to increase spectral efficiency. The responder MSTA may collect the BSR from the peer MSTAs within a predefined time period. The responder may allocate the MCCAOPs (e.g., in 60 GHz) based on the BSR of the neighbor MSTAs. The responder may broadcast the MCCA reply frames in 802.11s and/or 802.11ad frames. In one example, if 802.11s is used for the advertisement frame, then the advertisement frame may be simultaneously received by multiple requestor MSTAs due to broadcasting.

According to another embodiment, adaptive MCCA access fraction (MAF) may be based on QoS constraints. The MAF may be defined as the ratio of time reserved for MCCAOPs in the delivery traffic indication message (DTIM) interval for a particular MSTA to the duration of the DTIM interval. The maximum value for the MAF at an MSTA may be limited by a parameter called MAFLimit. The MAF and MAFLimit may be used to limit the use of MCCA by a particular MSTA. This MAF mechanism may be seen as a tool to avoid starvation of MSTAs that are not MCCA capable.

MAF may be maintained by taking into account QoS. For example, an MSTA may maintain MAF values specific to each configured QoS class, which may be referred to as QoS Access Fraction (QAF). QAF of a QoS class may be defined as the ratio of time reserved for MCCAOPs for that particular QoS in the DTIM interval for a particular MSTA to the duration of the DTIM interval. A limit referred to as QAFlimit may be associated with each QAF that may restrict the total MCCAOPs used up by the traffic from a particular QoS. For example, for a particular QoS the QAF≤QAFLimit may always be true.

MSTAs may be configured with an Aggregate Access Fraction (AAF) parameter that determines the total time reserved for MCCAOPs for all the configured QoS classes. The maximum value for the AAF for an MSTA may be limited by a parameter called AAFLimit. Each QAFLimit for each QoS class may be configured up to a max value of AAFLimit. For example, the MSTAs may treat the MAF (e.g., as defined in IEEE 802.11s) as AAF and MAFLimit as AAFLimit. In summary, any of the following equations may apply to MAF:

$$\sum_{i=0}^{maxQosClass} QAF(i) = AAF \leq AAFLimit \quad \text{Equation 1}$$

$$QAF(i) \leq QAFLimit(i) \forall i \in (0, maxQosClass-1) \quad \text{Equation 2}$$

$$QAFLimit(i) \leq AAFLimit \forall i \in (0, maxQosClass-1) \quad \text{Equation 3}$$

where maxQosClass refers to the maximum number of QoS classes supported by the system.

Examples of signaling QAF parameters are described herein. The MSTA may advertise the QAF parameters in the MCCAOP advertisement frames. In one example, the QAF parameters may be band specific. The MSTA may broadcast the band specific MCCAOP advertisement frame. The band specific MCCAOP advertisement frame may carry the QAF specific to that band. The MSTA may also request MCCAOPs specific to a particular QoS by including, in the MCCAOP setup request, the QoS identifier for the MCCAOP reservation.

QoS aware MCCAOP setup procedures are described herein. According to an embodiment, the MCCA owner may setup a new MCCAOP, such that conditions in the 802.11s specification are satisfied. In this case, the MCCAOP owner may determine the MCCAOP reservation based on QAF parameters. For example, an MCCAOP owner may consider one or more of the following criteria: the MCCAOP reservation for a particular QoS may not cause the corresponding QAF value to exceed QAFLimit either for the MCCA owner or for the neighbor MSTAs; and/or the MCCAOP reservation for a particular QoS may not cause the AAF value to exceed the configured AAFLimit, either for the MCCA owner or for the neighbor MSTAs.

Upon receiving a MCCAOP Setup request, an MCCAOP responder MSTA, in addition to conditions mentioned in IEEE 802.11s specifications, may verify any of the following conditions: the MCCAOP reservation for the requested QoS may not cause the corresponding QAF value to exceed QAFLimit either for the MCCA responder or for the neighbor MSTAs; and/or the MCCAOP reservation for the requested QoS may not cause the AAF value to exceed the configured AAFLimit either for the MCCA responder or for the neighbor MSTAs.

The following preemption procedures may be used. According to an embodiment, the MCCAOP owner and/or the MCCAOP responder may accommodate new MCCAOP reservation requests by preempting one or more of the existing MCCAOPs between them. In another embodiment, the preemption procedure may involve MSTAs which are neither MCCAOP owner nor MCCAOP responder.

The MSTAs may follow any of the following preemption rules. According to a preemption rule, if the new MCCAOP reservation for a particular QoS does not cause corresponding QAF to exceed QAFLimit and does not cause the AAF to exceed AAFLimit, then the MCCAOP setup may be considered successful.

According to another preemption rule, if the new MCCAOP reservation for a particular QoS does not cause QAF to exceed QAFLimit, but causes AAF to exceed AAFLimit, then any of the following actions may be taken. For example, MCCAOPs of lower than the requested QoS may be re-sized (i.e., reduced in size or decrease the periodicity) until the AAF becomes less than AAFLimit. In this case, MSTAs may use new MCCAOP Setup update messages to resize the existing MCCAOPs, or, the MSTAs may tear down the MCCAOPs and trigger a new MCCAOP setup message with modified MCCAOP size.

In another example, MCCAOPs of lower than the requested QoS may be torn down until AAF becomes less than AAFLimit. In another example, the resizing or purging decisions may be made based on minNQAF and minNAAF parameters. minNQAF is the minimum Access Fraction guaranteed for a particular neighbor for a specific QoS. minNAAF is the minimum Aggregate Access Fraction for a particular neighbor for all QoSes. These neighbor specific QAF parameters may be negotiated during mesh peering procedure or may be modified during MCCAOP setup/response procedures.

In another example, each MSTA may be configured with minOQAF and minOAAF parameters. The resizing or purging decisions may consider minOQAF and minOAAF. The minOQAF is the minimum Access fraction guaranteed for the own traffic with a particular QoS generated by the MSTA itself or for the traffic addressed to the MSTA. The minOAAF is the minimum Aggregate Access Fraction for all the traffic generated by or addressed to the MSTA. For example, these values may be zero for a pure relay MSTA.

In another example, each MSTA may be configured with minFQAF and minFAAF parameters. The resizing or purging decisions may consider minFQAF and minFAAF. Where minFQAF is the minimum Access fraction guaranteed for the traffic belonging to specific QoS forwarded via this particular MSTA. minFAAF is the minimum Aggregate Access Fraction for all the traffic forwarded by the MSTA. If the above actions would not make AAF less than AAF-Limit, then the new MCCAOP reservation may fail and procedures, such as those defined in IEEE 802.11s, may be performed.

According to another preemption rule, if the new MCCAOP reservation for a particular QoS causes QAF to exceed QAFLimit, then the new MCCAOP reservation may fail and appropriate procedures, for example in accordance with IEEE 802.11s, may be performed.

Buffer status advertisement procedures are described herein. MSTAs may periodically advertise their QoS specific buffer status to their mesh neighborhood. For example, the buffer status may capture the average occupancy for each logical buffer associated to different QoS classes. The buffer status may be advertised in a separate advertisement message or may be combined with MCCAOP advertisement message, for example. The MCCAOP owner may send the buffer status specific to the MCCAOP responder. In other words, the buffer status may provide the status of queues specific to the responder. The MCCAOP owner may use D-band transmissions to send such responder-specific buffer status reports. In an example, the MSTA specific buffer status may be sent in MCCAOP setup Request.

Each potential MCCAOP owner may track the buffer status advertisement from its mesh peers in some or every DTIM interval. Buffer status may be specific to bands, for example an MSTA may advertise the buffer status for O-band and D-band separately. This may be used if the mesh neighborhood has MSTAs which are either O-band or D-band capable, but not both. The MCCAOP owner may use the buffer status advertisement from peer MSTAs to prioritize the MCCAOP responder. For example, the MCCAOP owner may use the multi-band buffer status to prioritize the MCCAOP reservation in a particular band. The MCCAOP owner may prefer the candidate MSTAs with larger queue differentials, subject to inputs from the routing function.

Table 1 is an example buffer status advertisement element format, as described above, and may include, but is not limited to, any of the following elements: element ID; length; number of band list; and/or multi-band buffer status list. Table 2 is an example multi-band buffer status element format, as described above, and may include, but is not limited to, any of the following elements: band ID; channel number; number of QoS list; and/or multi-QoS buffer status list. Table 3 is an example multi-QoS buffer status element format, as described above, and may include, but is not limited to, any of the following elements: QoS ID; instantaneous buffer length; and/or average buffer length.

TABLE 1 buffer status advertisement element format

| Element ID | Length | Number of Band list | Multi-band Buffer status list |
|---|---|---|---|

TABLE 2 multi-band buffer status element format

| Band ID | Channel Number | Number of QoS List | Multi-QoS Buffer status list |
|---|---|---|---|

TABLE 3 multi-QoS buffer status element format

| QoS ID | Instantaneous Buffer length | Average Buffer length |
|---|---|---|

An MCCAOP update procedure including QoS and multi-band is described herein. An MCCAOP update message may be used either by MCCAOP responder or by the MCCAOP owner to modify the existing MCCAOP reservation without having to tear down and trigger a new setup procedure. An MCCAOP update procedure may be triggered as a result of preemption due to a QoS aware MCCA setup procedure. An MSTA may choose to trigger the update procedure instead of a teardown and setup procedure if the MCCAOP reservation re-uses parts of old reservation time period and/or is in the same band, and/or if any of the following conditions are true:

New MCCAOP Offset>=Old MCCAOP Offset; and/or

New MCCAOP offset<(Old MCCAOP offset+Old MCCAOP Duration); and/or

New MCCAOP duration<Old MCCAOP duration; and/or

New MCCAOP periodicity<=Old MCCAOP periodicity

In one example, the MSTA may use the MCCAOP update element to request the peer MSTA to update the existing MCCAOP reservation. Table 4 is an example MCCAOP update request element format, and may include, but is not limited to, any of the following elements: element ID; length; CCAOP reservation ID; and/or updated MCCAOP reservation. The filed updated MCCAOP reservation may carry the new MCCAOP offset, new MCCAOP duration and new MCCAOP periodicity. Table 5 is an example Updated MCCAOP Reservation and may include, but is not limited to, any of the following elements: band ID+channel number; QoS ID; new MCCAOP duration; new MCCAOP periodicity; and/or new MCCAOP offset.

TABLE 4

MCCAOP update request element format

| Element ID | Length | MCCAOP Reservation ID | Updated MCCAOP Reservation |
|---|---|---|---|
| | | | |

TABLE 5 updated MCCAOP reservation

| Band ID + channel number | QoS ID | New MCCAOP Duration | New MCCAOP Periodicity | New MCCAOP Offset |
|---|---|---|---|---|
| | | | | |

The MSTA may relocate the high priority MCCAOP reservation to an existing low priority MCCAOP reservation time period. In particular, the relocated MCCAOP reservation may use parts of one or more low priority QoS MCCAOP reservation time periods. The MSTA may relocate the high priority MCCAOP reservation to another band, which may override an existing low priority QoS MCCAOP reservation time period in the target band.

According to an embodiment, MCCAOP setup message may address QoS and multiband. An MCCAOP reservation may specify a schedule for frame transmissions. The time periods scheduled for frame transmissions in the reservation are called MCCAOPs. The schedule may be set up between an MCCAOP owner and one (for individually addressed frames) or more (for group addressed frames) MCCAOP responders. A dual band capable MSTA may provide the requested band information in the MCCAOP setup request message, for example in an additional field (e.g., band ID field), which may specify the preferred band and/or channel information. The Band ID field may be one octet in length and may be defined as in the example band ID field format shown in Table 6.

TABLE 6 band ID field

| Band ID value | Meaning |
|---|---|
| 0 | TV white spaces |
| 1 | Sub-1 GHz (excluding TV white spaces) |
| 2 | 2.4 GHz |
| 3 | 3.6 GHz |
| 4 | 4.9 and 5 GHz |
| 5 | 60 GHz |
| 6-255 | Reserved |

In addition to the band ID field, the MCCAOP owner may request the specific channel in which the MCCAOP is requested. For example, the MCCAOP owner may add the operating class and/or the specific channel number in the MCCAOP setup request message.

The MCCAOP owner may consider the capabilities of the MCCAOP responder before requesting specific band/channel combinations in the setup request message. The MCCAOP owner may choose to ignore the channel number in the setup request, in which case the MCCAOP responder may choose any channel in the requested band to allocate the MCCAOP. In another example, MCCAOP owner may include more than one band/channel combination in the MCCAOP setup request message.

According to an embodiment, MCCAOP allocation may be QoS specific. A QoS aware MSTA may include a QoS identifier in the MCCAOP setup request message. The QoS information may enable the service prioritization by the MSTAs and may serve as an input for preempting low priority services when a request for high priority service is made using MCCAOP setup requested. In one example, the QoS identifier may be mapped to the access category index (ACI). Table 7 is an example QoS to ACI index mapping, where: AC_BE is access category for best effort, AC_BK is the access category for background, AC_VI is the access category for video, and AC_VO is the access category for voice.

TABLE 7

QoS to ACI index mapping

| ACI | AC | Description |
|---|---|---|
| 00 | AC_BE | Best Effort |
| 01 | AC_BK | Background |
| 10 | AC_VI | Video |
| 11 | AC_VO | Voice |

The MSTAs (MCCAOP owner, MCCAOP responder) transmitting data during the MCCAOP reservation, which was setup using explicit QoS request, may follow the following prioritization order. For example, the data belonging to the QoS for the corresponding MCCAOP reservation may be prioritized. If there is additional space left in the MCCAOP reservation, the MSTA may apply one or more of the following rules, in any combination. According to a rule, the MCCAOP may be truncated by transmitting a CF-End frame or QoS Null frame. According to another rule, the data belonging to the next high priority QoS class addressed to the receiving MSTA for the current MCCAOP reservation may be mapped. According to another rule, the data belonging to the QoS which has highest buffer backlog may be mapped. According to another rule, the data belonging to the QoS which has lowest QAF may be mapped.

Table 8 is an example MCCAOP setup request element format including, but not limited to: element ID; length MCCAOP reservation ID; and/or MCCAOP reservation. Table 9 is an example MCCAOP Setup Request element with Band and QoS information including, but not limited to: element ID; length; QoS ID; band ID; channel number; MCCAOP reservation ID; and/or MCCAOP reservation. Table 10 is an example MCCAOP Setup Request element with multi-band request including, but not limited to: element ID; length; QoS ID; number band list; and/or multi-band reservation list. Table 11 is an example multi-band reservation list including, but not limited to: band ID; channel number; MCCAOP reservation ID; and/or MCCAOP reservation.

TABLE 8

MCCAOP setup request element format

| Element ID | Length | MCCAOP Reservation ID | MCCAOP Reservation |
|---|---|---|---|
| | | | |

TABLE 9

MCCAOP setup request element with band and QoS information

| Element ID | Length | QoS ID | Band ID | Channel number | MCCAOP Reservation ID | MCCAOP Reservation |
|---|---|---|---|---|---|---|
| | | | | | | |

TABLE 10

MCCAOP setup request element with multi-band request

| Element ID | Length | QoS ID | Number band list | Multi-band reservation list |
|---|---|---|---|---|

TABLE 11 multi-band reservation list

| Band ID | Channel number | MCCAOP Reservation ID | MCCAOP Reservation |
|---|---|---|---|

Upon receiving the MCCAOP setup request message, the MCCAOP responder may perform any of the following actions. For example, the reservation for at least one band if multi-band information is present) may not overlap with the neighborhood MCCAOP periods for that particular band. The reservation may not cause MAF limit to be exceeded for itself or its neighbor MSTAs. The reservation may not cause any of the QAF limits to be exceeded, as described above.

If two or more bands satisfy the above criteria, the MCCAOP responder may perform any combination of the following actions: choose the band for which the MAF (or QAF) of the mesh neighborhood for that particular QoS is lowest; choose the band where the interference metric is the lowest; choose the band with lowest buffer backlog for that particular QoS; choose more than one band and allow the traffic for the particular QoS to be split between those bands; and/or choose the band in the order of preferred band configuration provided by the SME interface. Table 12 is an example MCCAOP setup reply that may include, but is not limited to: element ID; length; MCCAOP reservation ID; MCCA reply code; and/or MCCAOP reservation.

TABLE 12

MCCAOP setup reply

| Element ID | Length | MCCAOP Reservation ID | MCCA Reply Code | MCCAOP Reservation |
|---|---|---|---|---|

If a single band does not satisfy the MCCAOP reservation requirements requested by the MCCAOP owner, for example due to MAF or QAF limits, the MCCAOP responder may choose to split the allocation across two bands. The MCCAOP responder may still obey the rules for band parameters (e.g., MAF, QAF) for each part of individual allocation. In this case, the MCCAOP responder may send an MCCAOP setup reply with the multi-band information in a list of MCCAOP reservation fields. The MCCAOP reservation list may capture different parts of the allocation with associated band/channel information. Table 13 is an example MCCAOP setup reply element format with multi-band information that may include, but is not limited to: element ID; length; number reservation list; and/or multi-band reservation list.

TABLE 13

MCCAOP setup reply element format with multi-band information

| Element ID | Length | Number reservation list | Multi-band reservation list |
|---|---|---|---|

According to an embodiment, MCCAOP advertisement may address QoS and multi-band. For example, each MSTA may advertise its MCCAOP advertisement set to its neighbor MSTAs. The advertisement set may include own TX-RX reservation, reservations in the neighborhood that may cause interference and the broadcast reservations. To enable QoS aware MCCAOP reservation, the MSTA may advertise the QoS class of each MCCAOP reservation that belongs to the advertisement set. An MCCAOP owner may consider the QoS information of each MCCAOP reservation advertised by responder and the neighborhood to make preemption decisions.

The MCCAOP reservations advertised in the MCCAOP advertisement frames may include an additional QoS identifier. In one example, the QoS identifier may be appended to MCCAOP reservation field. Table 14 is an example MCCAOP reservation field that may include, but is not limited to: MCCAOP duration, MCCAOP periodicity, MCCAOP offset, and/or QoS identifier. A QoS identifier may be added to any or all the reports in the advertisement set, including TX-RX report, broadcast report and/or interference report.

TABLE 14

MCCAOP reservation field

| MCCAOP duration | MCCAOP Periodicity | MCCAOP Offset | QoS identifier |
|---|---|---|---|

MCCAOP advertisement may also carry the in addition to MAF parameters to enable QoS aware MCCAOP reservation procedures. In one example, the QAF parameters may be added to MCCAOP advertisement overview element. Table 15 is an example MCCAOP Advertisement overview element format that includes, but is not limited to: element ID, length, advertisement sequence number, flags, MCCA access fraction, MAF limit, QAF length, QAF list, band ID+channel number, and/or advertisement elements bitmap. Table 16 is an example QAF list that includes, but is not limited to: QoS ID, QoS access fraction, and/or QAF limit.

TABLE 15

MCCAOP advertisement overview element format

| Element ID | Length | Advertisement Sequence Number | Flags | MCCA Access Fraction | MAF Limit | QAF length | QAF List | Band ID + Channel number | Advertisement Elements Bitmap |
|---|---|---|---|---|---|---|---|---|---|

TABLE 16 new QAF list

| QoS identifier | QoS Access Fraction | QAF Limit |
|---|---|---|

An MSTA may broadcast the MCCA advertisement frame for a set of QoS triggers, in addition to other triggers, as described in the following. For example, a frame broadcast may be triggered when the MCCAOP responder accepts a new MCCAOP reservation and the MCCAOP responder may change the QAF of one or more QoS class (e.g., directly due to new MCCAOP reservation, or indirectly due to the preemption of existing MCCAOP reservation). In another example, a frame broadcast may be triggered when the MCCAOP owner receives confirmation for MCCAOP reservation from the MCCAOP responder that changes the QAF of one or more QoS classes. In another example, a frame broadcast may be triggered when the MSTA receives MCCAOP update frame that preempts or changes the MCCAOP reservation belonging one or more QoS classes. In another example, a frame broadcast may be triggered when the MCCAOP responder receives an explicit MCCAOP teardown request or performs an implicit teardown that changes the value of the QAF. The same applies for the MCCAOP owner which triggered the teardown request.

In an example, the MSTA may advertise only the MCCAOP reservations that are modified by broadcasting the appropriate bitmaps in the advertisement overview element. The MSTA may also choose to selectively broadcast the QAF parameters which are modified. In another example, the MSTA may advertise the status of multiple bands, for example in a common pre-configured band (e.g., O-band) or advertisement message such that each band may carry the status of that specific band.

According to an embodiment, an MCCAOP advertisement request message may address QOS and multi-band. An MSTA may transmit an MCCAOP advertisement request frame to request all the MCCAOP advertisement elements or a selected subset of MCCAOP advertisement elements from the neighbor peer MSTA. In one example, the MSTA may request the status of a specific time period in the DTIM interval, whether it is reserved or free. For example, the specific time period may be requested by the MCCAOP reservation report field. The responding MSTA may provide the status of the specific time period and it may specify which QoS class for the specific time period being used. In case two or more MCCAOPs cover the requested time period, then a list of QoS classes and the conflicting MCCAOP reservations may be provided.

In another example, the requesting MSTA may specifically query the status of a time period in a particular band of interest. For example, this may be specified by adding a list of band IDs to the MCCAOP advertisement request, for which the status is requested. Table 17 is an example MCCAOP advertisement request frame format that may include, but is not limited to: element ID; length; advertisement sequence number; flags; MCCA access fraction; MAF limit; QOA length; band list length; band ID+channel list; MCCAOP reservation report; and/or advertisement elements bitmap. Table 18 is an example MCCAOP reservation report field that may include, but is not limited to: number of MCCAOP reservation; and/or MCCAOP reservation 1 . . . MCCAOP reservation n.

TABLE 17

MCCAOP advertisement request frame

| Element ID | Length | Advertisement Sequence Number | Flags | MCCA Access Fraction | MAF Limit | QAF length | . . . |
|---|---|---|---|---|---|---|---|
| . . . | QAF List | Band list length | Band ID + channel list | MCCAOP reservation report | Advertisement Elements Bitmap | | |

TABLE 18

MCCAOP reservation report field

| Number of MCCAOP reservation | MCCAOP reservation 1 | . . . | MCCAOP reservation n |
|---|---|---|---|

According to an embodiment, QoS based MCCAOP reservation procedures may involve multiple MSTAs. The addition of a QoS ID in the MCCAOP reservation field, as described above, may allow MCCAOP reservations based on QoS considerations spanning multiple MSTAs. This may involve communication between an MSTA that wants to set up a new MCCAOP for a higher QoS class than an existing MCCAOP between another pair of neighboring MSTAs. This may result in teardown or modification of existing lower QoS MCCAOP and setting up of a new MCCAOP with higher QoS. An example QoS based MCCAOP reservation procedure may be as follows.

The MSTA wanting to establish a new MCCAOP with a higher QoS class may send a MCCAOP advertisement request frame to collect MCCAOP advertisements from its neighbors, or may listen passively to collect the MCCAOP advertisements. In either case, the MSTA may determine the transmission schedule and the associated QoS classes of all transmissions. The MCCAOP reservation field described above may be used here. If the MSTA determines that the MCCAOP schedule between another MSTA pair with lower QoS class occupies the only time slots available to it, then the MSTA may send a request to one of the MSTAs involved in the existing MCCAOP to vacate the channel at those time. Accordingly, the MSTA may send a MCCAOP setup request frame to the neighbor MSTA that is part of the existing MCCAOP, either as owner or responder.

The MCCAOP reservation ID field may contain the value 255. This may indicate to the MSTA involved in the existing MCCAOP, that this is a MCCAOP modification request. The MCCAOP reservation field may contain the timing information related to the proposed new MCCAOP with higher QoS class. This may overlap with multiple existing MCCAOPs with the target MSTA as a participant. Upon receiving the MCCAOP setup request from the requesting MSTA with reservation ID field value of 255, the target MSTA may determine if its existing MCCAOP(s) may be modified. If the target MSTA determines that modification is possible, then the target MSTA may send a MCCAOP setup request or MCCAOP teardown frame to its counterpart in the affected MCCAOP.

When the target MSTA receives confirmation from its counterpart regarding change in MCCAOP, either as changed advertisement element or a mesh setup response frame, it may send a MCCAOP setup reply to the requesting MSTA. In the transmitted MCCAOP setup reply, the target MSTA may set the value of reservation ID field to 255, such as in the received MCCAOP setup request. The MCCA reply code field may be set to the value that determines the decision, whether the MCCAOP setup request is granted or not.

The MCCAOP reservation field may be present. When present, it may represent an alternative to the MCCAOP reservation specified in the MCCAOP setup request message. When the MCCAOP reply code is set to 1 (i.e., Reject: MCCAOP reservation conflict), the MCCAOP reservation field may be present. When the MCCAOP Reply Code is set to other values, the MCCAOP reservation field may not be present.

When the requesting MSTA receives the MCCAOP setup reply message from the target MSTA with reply code value indicating acceptance, or a MCCAOP reservation that is acceptable, the requesting MSTA may send a MCCAOP setup request message to the intended responder of the new MCCAOP. The responder may respond with MCCAOP setup reply message indicating its acceptance, and the new MCCAOP may become operational. The new schedule may be included in future MCCAOP advertisement elements transmitted by the two MSTAs either as part of beacons or MCCAOP advertisement frames. The MCCAOP advertisement messages may be broadcast on O-band for transmission efficiency. Data transmissions may occur in D-band.

Additionally, a new Long MCCAOP Reservation field may be used to identify possibilities for simultaneous directional transmission opportunities in D-band. Table 19 is an example of a Long MCCAOP Reservation field that may include, but is not limited to: MCCAOP duration; CCAOP periodicity; MCCAOP offset; MCCAOP QoS ID; MCCAOP reservation ID; and/or MCCAOP owner ID.

TABLE 19 long MCCAOP reservation field

| MCCAOP Duration | MCCAOP Periodicity | MCCAOP Offset | MCCAOP QoS ID | MCCAOP Reservation ID | MCCAOP Owner ID |
| --- | --- | --- | --- | --- | --- |

During an interference measurement procedure, a MSTA may associate observed signal power levels with a pair of MCCAOP Owner ID and MCCAOP Reservation ID, which may uniquely identify a transmission direction at a neighboring MSTA. Thereafter, by examining the MCCAOP Owner ID and MCCAOP Reservation ID in received MCCAOP Advertisement elements during regular data transmissions, the MSTA may determine if the advertised directional transmission will interfere with any of its MCCAOPs/neighbor transmissions. If an MCCAOP/neighbor is identified that is not affected by the advertised MCCAOP between other neighboring MSTAs, then the MSTA may schedule a MCCAOP with the identified neighbor to coincide in time with the other MCCAOP. This may enable concurrent directional transmission opportunities.

Hybrid routing procedures for dual-band mesh networks are described herein. A metric determination may be used for routing in 802.11ad and 802.11s based hybrid networks, which may include the information exchange procedures, and hybrid routing protocol actions. The airtime link metric may include O-band and D-band metrics. An airtime link metric $c_a$ for an MSTA A may be defined to incorporate the effect of interference due to selecting the corresponding link:

$$c_a = \left[O + \frac{B_t}{r}\right]\frac{1}{1-e_f} \qquad \text{Equation 4}$$

where r is the data rate of test frame size $B_t$; and $e_f$ is the frame error rate for the test frame.

csd=$f(c_a, \text{int}_{sd})$. $\text{int}_{sd}$ is a factor that may quantify the links that cannot be scheduled by neighbor MSTAs due to transmission. csd may define an updated airtime link metric to include the effect of links that cannot be scheduled as well as the airtime link metric $c_a$. Here, $f$ may represent an arbitrary function that inputs $c_a$ and $\text{int}_{sd}$. $\text{int}_{sd}$ may define an indicator function such that $\text{int}_{sd}=(\text{int}_s, \text{int}_d)$ is an OR operation with $\text{int}_s$ and $\text{int}_d$ taking binary units, 0 or 1. $\text{int}_s$ may define an indicator which takes the value 1 if the source's transmission address to the destination creates interference at any node pair in the network. Otherwise, it may take the value of 0. Similarly, $\text{int}_d$ may define an indicator that may take the value 1 if the destination's transmission addressed to the source creates interference at any node pair in the network. Otherwise, it may take the value of 0. Hence, based on the values of $\text{int}_s$ and $\text{int}_d$, csd may take the value of csd=(0,0)=0; csd:=(0,1):=(1,0):=1, 1)=1.

Figure 11:
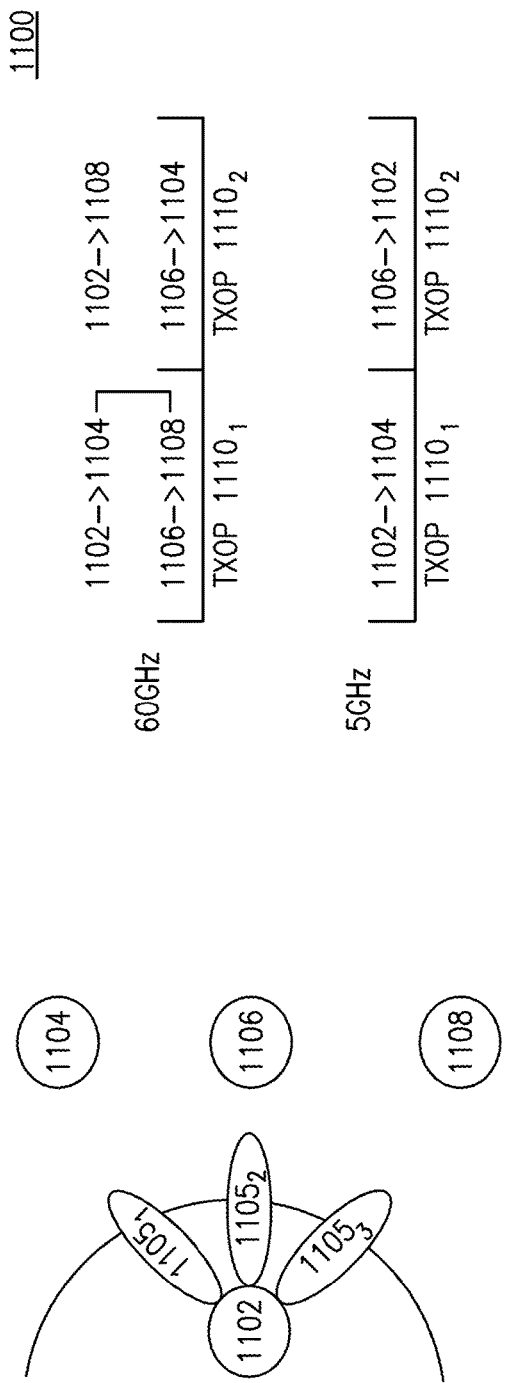
FIG. 11 is a system and signaling diagram of an example multi-band routing and scheduling procedure.

FIG. 11 is a system and signaling diagram of an example multi-band routing and scheduling procedure 1100. The dual-band MSTAs shown in FIG. 11 include MSTA 1102, MSTA 1104, MSTA 1106, and MSTA 1108. In the 5 GHz band, during TXOP 11101 the transmission from MSTA 1102 to MSTA 1104 may prevent MSTA 1106 to MSTA 1108 scheduling. For example, with $\text{int}_{sd}=(\text{ints}, \text{intd})$, the source or s=MSTA 1102, the destination or d=MSTA 1104, then $\text{int}_{sd}=1$, since MSTA 1102 to MSTA 1104 transmission may create interference to the MSTA 1106 to MSTA 1108 communication. On the other hand, in 60 GHz, the transmission of MSTA A may not prevent the scheduling of any other STAs, hence intd=0. In another example, the real interference values may be incorporated into the metrics. For example, $\text{int}_{s,1106-1108}=x$; $\text{int}_{d,1106-1108}=y$, and so forth, which may be utilized in route determination.

Figure 12:
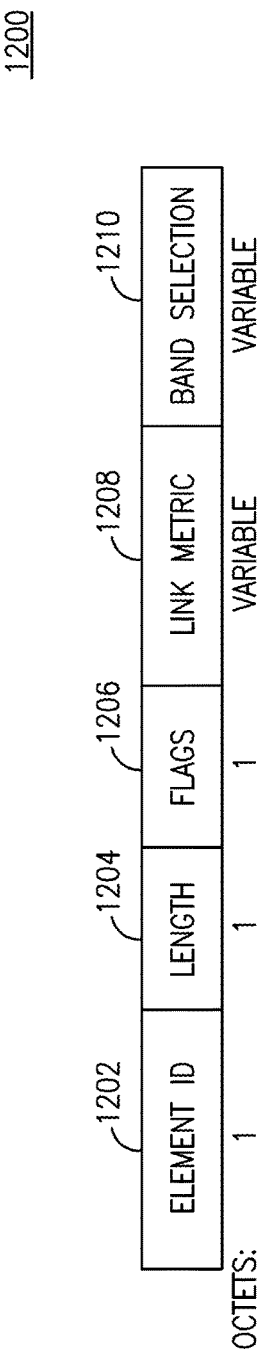
FIG. 12 is a diagram of an example Mesh Link Metric Report element.

FIG. 12 is a diagram of an example mesh link metric report element 1200. The mesh link report element 1400 may include, but is not limited to, any of the following elements: element ID 1202 (e.g., 1 octet); length 1204 (e.g., 1 octet); flags 1208 (e.g., 1 octet); airtime link metric 1208 (e.g., variable number of octets); and/or band selection 1210 (e.g., variable number of octets). In one example, the MSTAs may exchange test frames in 5 GHz and 60 GHz, and the mesh link metric report element 1200 may be transmitted in 5 GHz only with a link metric element 1208. The link metric 1208 may include both bands. In another example, the mesh link metric report element 1200 may be transmitted in both bands.

The path target MSTA may obtain the path metric via path request (PREQ) frames in 802.11s. The PREQ frames include path metric that may be a combination of O-band and D-band metrics. Each intermediate MSTA that receives a PREQ frame may check the path metric in the frame. If the metric is better than the existing one, the MSTA may update its path information to the originator MSTA and may propagate the PREQ to the neighbors. In one example, in dual band, the MSTA may also include a bit sequence (band selection) that denotes whether O-band and/or D-band is selected in updating the path metric. The selection procedure may also consider the interference created as given by $\text{int}_{sd}$.

The airtime link metric for 802.11s mesh networks may be designed for optimum path selection in omni-directional mesh networks. The airtime link metric $c_a$ may be a cumulative metric that reflects the total time required to transmit a unit test packet from source to destination. While the metric is sufficient to capture individual link and end-to-end path metrics for O-band mesh networks, the metric may fail to properly capture the effects of simultaneous transmissions by directional MSTAs. Thus, additional link metrics and path selection procedures for directional mesh networks are described below.

A locally-aware link metric update procedure is described herein. The Hybrid Wireless Mesh Protocol (HWMP) procedure may determine an optimum source to destination path based on airtime link metric. According to an example procedure, a source may send a PREQ message with an ID of an intended destination. An airtime link metric value may be included in the message (e.g., $c_a=0$ initially). A hop count may also be included (initialized to 0).

All MSTAs that receive the PREQ message may forward it on to their neighbors with following modifications and exceptions. The airtime link metric may be updated with the value for the particular link as follows:

$$c_a(j)=c_a(j-1)+c_a \qquad \text{Equation 5}$$

where, $c_a(j)$ is the updated airtime link metric; $c_a(j-1)$ is the value in the received PREQ message and $c_a$ is the calculated link metric for the link from the PREQ source to the current MSTA.

If the MSTA has already forwarded a PREQ message for the source-destination pair with a smaller airtime link metric within a preceding predetermined duration, the MSTA may drop and may not forward the current PREQ message. This may prevent unnecessary forwarding of packets with inferior cumulative path metric. If the MSTA already knows a path to the destination, then it may respond to the PREQ sender with a path response (PREP) message with the cumulative path metric to destination. The PREQ message may not be forwarded towards the destination in this case.

The destination MSTA may receive multiple PREQ messages from its neighbors. The destination MSTA may then determine the optimum path based on the smallest cumulative airtime link metric. The destination MSTA may send a PREP message to the MSTA that sent the PREQ message with smallest metric. The destination MSTA may include the final cumulative metric calculated by the destination MSTA in the PREP message. The PREP message may be relayed back by each MSTA to its previous MSTA with the smallest cumulative metric at that point. This message may ultimately get back to the source and therefore establish the optimum path.

According to an embodiment, a locally-aware link metric update procedure may capture simultaneous directional transmissions effects. The link metric calculations may be modified to account for interference due to simultaneous transmissions in the vicinity of each MSTA forming a potential path.

MSTAs may collect interference measurements, as follows. These measurements may follow a schedule that determines when and in what direction each MSTA transmits a test packet or a reference sequence, while other MSTAs simultaneously perform directional measurements. At the end of the interference measurement phase, each MSTA may know the interference power when it points its receiving antenna towards each of its one-hop neighbors.

A source MSTA may send PREQ message with an ID of an intended destination MSTA individually to each of its neighbors using appropriate antenna patterns. Airtime link metric value may be included in the message ($c_a=0$ initially). A hop count may also be included (initialized to 0). The MSTAs that receive the PREQ message may update it with the link metric for the previous link from the PREQ sender to the current MSTA. However, the airtime link metric may be modified as follows:

$$c'_a = \left[O + \frac{B_t}{r'}\right]\frac{1}{1-e_f} \qquad \text{Equation 6}$$

where, r' is the data rate for test packet transmission, including interference effect.

For a particular receive antenna configuration, the effective interference power may be calculated based on the interference measurements obtained previously. In case of multiple interferers, the max power, sum of all powers, or some weighted average may be used.

The airtime link metric may be updated with the value for the particular link as follows:

$$c_a(j)=c_a(j-1)+c_a' \qquad \text{Equation 7}$$

where, $c_a(j)$: updated airtime link metric, $c_a(j-1)$ is the value in the received PREQ message and $c_a'$ is the calculated link metric for the link from the PREQ source to the current STA.

If the MSTA has already forwarded a PREQ message for the source-destination pair with a smaller airtime link metric within a shorter preceding predetermined duration, the MSTA may drop and not forward the current PREQ message. This may prevent unnecessary forwarding of packets with inferior cumulative path metric. If the MSTA already knows a path to the destination, then it may respond to the PREQ sender with a path response (PREP) message with the cumulative path metric to destination. The PREQ message may not be forwarded towards the destination in this case.

The destination MSTA may receive multiple PREQ messages from its neighbors. It may then determine the optimum path based on the smallest cumulative airtime link metric. The destination MSTA may send a PREP message to the MSTA that sent the PREQ message with smallest metric. It may include the final cumulative metric calculated by it in the PREP message. The PREP message may be relayed back by each MSTA to its previous MSTA with the smallest cumulative metric at that point. This message may get back to the source and therefore establish the optimum path.

A regionally-aware link metric update procedure is described herein. The following describes example procedures to choose optimum network-wide source-destination paths by including inter-link effects in path metric calculations. Accordingly, link metric calculations between a particular pair of MSTAs may take into account the interference caused by neighboring directional links and also the interference caused to neighboring links.

The link update procedure may include interference measurement and result exchange. MSTAs may make directional measurements when a single MSTA transmits at a time. In this case, each MSTA may transmit a training field or a test packet towards the direction of each of its neighbors, while other MSTAs may make signal strength measurements in the direction of each of their neighbors. At the end of the interference measurement phase, each MSTA may know the interference power when it points its receiving antenna towards each of its one-hop neighbors.

Each receiving MSTA may also send an interference measurement report to the transmitting STA. The level of observed interference may be reported in terms of the decrease in link quality due to interference caused by the transmitting MSTA towards each of its neighbors. The reporting MSTA may compute the airtime link metric impact, $\Delta c_a$, to the transmitting MSTA and send in the interference report. This may be computed as follows (assuming $e_f$ is the same in both cases):

$$\Delta c_a = (c_a)_{interference} - (c_a)_{no\ interference} \qquad \text{Equation 8}$$
$$= c'_a - c_a$$
$$= \left[O + \frac{B_t}{r'}\right]\frac{1}{1-e_f} - \left[O + \frac{B_t}{r}\right]\frac{1}{1-e_f}$$

-continued $$= \left[\frac{1}{r'} - \frac{1}{r}\right] \frac{B_t}{1-e_f}$$

The link update procedure may include cumulative path metric calculation. A source MSTA may send a PREQ message with an ID of an intended destination individually to each of its neighbors using appropriate antenna patterns. An airtime link metric value may be included in the message. However, the initial value of the airtime link metric may not zero in this case. The sum of airtime link metric impact ($\Delta c_a$) values collected from the interfered may be the initial value. The airtime link metric $c_a$ may be calculated as follow:

$$c_a(0) = \Sigma_{i \in I_k} \{\Delta c_a\}_i \qquad \text{Equation 9}$$

where $I_k$ is the set of all MSTAs in the interference zone of the source MSTA when transmitting to $k^{th}$ neighbor. A hop count may also be included (initialized to 0).

The MSTAs that receive the PREQ message may update it with the airtime link metric $c_a$ for the previous link from the PREQ sender to the current STA. However, the airtime link metric may be modified as follows:

$$c'_a = \left[O + \frac{B_t}{r'}\right] \frac{1}{1-e_f} \qquad \text{Equation 10}$$

where, r' is the data rate for test packet transmission, including interference effect. For a particular receive antenna configuration, the effective interference power may be calculated based on the interference measurements obtained previously. In case of multiple interferers, the max power, sum of all powers, and/or some weighted average may be used.

The airtime link metric may be updated with the value for the particular link as follows:

$$c_a(j) = c_a(j-1) + c'_a \qquad \text{Equation 11}$$

where, $c_a(j)$ is the updated airtime link metric, $c_a(j-1)$ is the value in the received PREQ message, and $c'_a$ is the calculated link metric for the link from the PREQ source to the current STA.

Before forwarding the airtime link metric to its neighbors, the MSTA may update it for each individual neighbor as follows:

$$\{c_a(j)\}_k = c_a(j) + \Sigma_{i \in I_k} \{\Delta c_a\}_i \qquad \text{Equation 12}$$

where $I_k$ represents the set of all MSTAs in the interference zone when current MSTA transmits to its $k^{th}$ neighbor.

If the MSTA has already forwarded a PREQ message for the source-destination pair with a smaller airtime link metric within a short preceding duration, it may drop the current PREQ message and may not forward it. This may prevent unnecessary forwarding of packets with inferior cumulative path metric. If the MSTA already knows a path to the destination, then the MSTA may respond to the PREQ sender with a PREP message with the cumulative path metric to destination. The PREQ message may not be forwarded towards the destination in this case.

The destination may receive multiple PREQ messages from its neighbors. It then may determine the optimum path based on the smallest cumulative airtime link metric. The destination MSTA may send a PREP message to the MSTA that sent the PREQ message with smallest metric. The destination MSTA may include the final cumulative metric calculated by it in the PREP message.

The PREP message may be relayed back by each MSTA to its previous MSTA with the smallest cumulative metric at that point. This message may get back to the source and therefore establish the optimum path. This above described procedure may determine the optimum path in terms of transmission rate, and the MSTA may determine a path that causes the least additional interference to neighboring links along the path.

The link update procedure may include route setup intimation. After path establishment, each mesh MSTA in the chosen path may send a route setup intimation message to every MSTA within an interference zone associated with MSTAs transmitting in the direction of the next MSTA in the path. This may cause the neighboring MSTAs to adjust their transmission rates to account for the interference from the newly setup link.

The neighboring MSTAs, upon receiving the route setup intimation, may send a link metric update to each destination MSTA that has a path passing through that STA. This may cause the destination MSTAs to re-evaluate the path metrics for the path passing through the affected MSTA.

Dual-band management frame prioritization is described herein. In a dual-band mesh network, D-band management frames may be transmitted using O-band messages. However, since such messages are normally transmitted using contention based mode, in a highly loaded network these transmissions may be delayed. The following approaches may be used to prevent such delays: prioritization of dual-band management frames; and/or contention-free transmission of dual-band management frames.

Dual-band management frame transmission in contention-free mode is described herein. An MSTA may transmit dual-band management or action frames during MCCAOPs to ensure contention-free transmission and also for schedule predictability. The owner MSTA may follow 802.11s procedures for MCCAOP reservation, including sending an MCCAOP setup request element, and receiving an MCCAOP setup response element in response to the responder MSTA. These setup messages may be exchanged in contention-based mode.

D-band action frames, such as MCCA Advertisement frame, MCCA Advertisement Request frame, MCCA Setup Request frame, MCCA Setup Response frame, Mesh Link Metric Report frame and HWMP Mesh Path Selection frame, may be transmitted in these O-band MCCAOPs reserved for dual-band management frames. The duration and periodicity of these MCCAOPs may be determined by the owner MSTA based on the timing requirements of D-band action frames.

Prioritization of dual-band management frames is described herein. The 802.11ae standard may include QoS management frames (QMF) support. When the QMF service is enabled, some management frames may be transmitted using an access category other than the access category assigned to voice traffic (access category AC_VO) in order to improve the QoS of other traffic streams. This may be achievable by the use of a QMF policy. A QMF policy may define the access categories of different management frames. The QMF MSTA may assign an access category to each management frame according to the access category assignments indicated in the QMF policy that have been configured using the configuration procedures.

802.11ae may specify a default QMF policy. It may define the access category of each management frame based on management subtype value, category value and/or action value. However, mesh action frames may be assigned QMF access category AC_BE, corresponding to best effort traffic. An additional management frame category for dual-band mesh action may provide D-band management frames transmitted on O-band with higher transmission priority. Table 20 shows an example of a QMF policy table that includes, but is not limited to, a mesh action and/or a dual-band mesh action category, and the following elements: management frame subtype value; category value; action class; and/or QMF access category.

TABLE 20 default QMF policy

| Description | Management Frame Subtype value | Category value | Action class | QMF access category |
|---|---|---|---|---|
| Mesh Action | 1101 | 13 | 0, 2, 4-10 | AC-BE |
| Dual-band Mesh Action | 1101 | 13 | 0-10 | AC-VO |

Although techniques described above consider 802.11 protocols, one of ordinary skill in the art will appreciate that the techniques are applicable to other wireless systems and protocols.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer. Although the solutions described herein consider 802.11 specific protocols, it is understood that the solutions described herein are not restricted to this scenario and are applicable to other wireless systems as well.

What is claimed:

1. A dual-band mesh station (MSTA) capable of operating in an O-band and a D-band and seeking to join a mesh network, the MSTA comprising:
 a receiver configured to receive O-band beacons from at least one MSTA in the mesh network, wherein the O-band beacons include D-band mesh information and a D-band beacon time interval;
 a transmitter configured to transmit D-band beacons in the D-band beacon time interval specified by the O-band beacons;
 on a condition a beacon response message is received via O-band, the transmitter configured to transmit D-band association information via O-band management frames to join the mesh network on the D-band;
 the receiver configured to receive a D-band transmit-receive (TX-RX) schedule from at least one neighboring MSTA in the mesh network including transmission schedule information and transmission direction information for one-hop and two-hop neighboring MSTAs, wherein a one-hop neighboring MSTA communicates directly with the dual-band MSTA and a two-hop neighboring MSTA communicates with the dual-band MSTA via a one-hop neighboring MSTA; and
 a scheduler configured to schedule contention-free concurrent transmissions with the one-hop and two-hop neighboring MSTAs in the mesh network in the D-band, based on the transmission schedule information and the transmission direction information, by communicating via O-band management frames.

2. The dual-band MSTA of claim 1, wherein the D-band mesh information includes at least one of the following: a mesh identifier (ID), mesh configuration elements, a path selection protocol ID, a path selection metric ID, a congestion control mode ID, a D-band capability element, a beacon transmission timing, an D-band operating channel, and a beacon transmission interval.

3. The dual-band MSTA of claim 2, wherein the D-band capability element includes at least one of the following: an antenna capability and a maximum transmit-receive (TX-RX) range.

4. The dual-band MSTA of claim 1, wherein the D-band association information includes at least one of the following: sector-sweep feedback, and D-band mesh identification (ID).

5. The dual-band MSTA of claim 1, wherein the transmitter is further configured to transmit D-band transmission information including at least one of the following: D-band TX-RX schedules, TX-RX beam orientations, a pre-determined interference table of one-hop neighbors, and a pre-determined interference table of two-hop neighbors.

6. The dual-band MSTA of claim 1, wherein on a condition that no O-band beacons are received within a predetermined period:
 the receiver is further configured to scan in D-band.

7. The dual-band MSTA of claim 1, wherein 802.11s is used in the O-band and 802.11ad is used in the D-band.

8. The dual band MSTA of claim 1, wherein the O-band is less than 6 GigaHertz (GHz) and the D-band is greater than 28 GHz.

9. A method for joining a mesh network, performed by a dual-band mesh station (MSTA) capable of operating in an O-band and a D-band, the method comprising:
 receiving O-band beacons from at least one MSTA in the mesh network, wherein the O-band beacons include D-band mesh information and a D-band beacon time interval;
 transmitting D-band beacons in the D-band beacon time interval specified by the O-band beacons;
 on a condition a beacon response message is received via O-band, transmitting D-band association information via O-band management frames to join the mesh network on the D-band;
 receiving a D-band transmit-receive (TX-RX) schedule from at least one neighboring MSTA in the mesh network including transmission schedule information and transmission direction information for one-hop and two-hop neighboring MSTAs, wherein a one-hop neighboring MSTA communicates directly with the MSTA and a two-hop neighboring MSTA communicates with the MSTA via a one-hop neighboring MSTA; and
 scheduling contention-free concurrent transmissions with the one-hop and two-hop neighboring MSTAs in the mesh network in the D-band, based on the transmission schedule information and the transmission direction information, by communicating via O-band management frames.

10. The method of claim 9, wherein the D-band mesh information includes at least one of the following: a mesh identifier (ID), mesh configuration elements, a path selection protocol ID, a path selection metric ID, a congestion control mode ID, a D-band capability element, a beacon transmission timing, an D-band operating channel, and a beacon transmission interval.

11. The method of claim 10, wherein the D-band capability element includes at least one of the following: an antenna capability and a maximum transmit-receive (TX-RX) range.

12. The method of claim 9, wherein the D-band association information includes at least one of the following: sector-sweep feedback, and D-band mesh identification (ID).

13. The method of claim 9, further comprising:
transmitting D-band transmission information including at least one of the following: D-band TX-RX schedules, TX-RX beam orientations, a pre-determined interference table of one-hop neighbors, and a pre-determined interference table of two-hop neighbors.

14. The method of claim 9, wherein on a condition that no O-band beacons are received within a predetermined period, further comprising:
scanning in D-band.

15. The method of claim 9, wherein 802.11s is used in the O-band and 802.11ad is used in the D-band.

16. The method of claim 9, wherein the O-band is less than 6 GigaHertz (GHz) and the D-band is greater than 28 GHz.

* * * * *